United States Patent
Isono

(10) Patent No.: US 8,366,204 B2
(45) Date of Patent: Feb. 5, 2013

(54) BRAKE SYSTEM FOR VEHICLE

(75) Inventor: Hiroshi Isono, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 1003 days.

(21) Appl. No.: 12/092,414

(22) PCT Filed: Nov. 8, 2007

(86) PCT No.: PCT/JP2007/071717
§ 371 (c)(1),
(2), (4) Date: May 2, 2008

(87) PCT Pub. No.: WO2008/056741
PCT Pub. Date: May 15, 2008

(65) Prior Publication Data
US 2010/0212314 A1 Aug. 26, 2010

(30) Foreign Application Priority Data

Nov. 8, 2006 (JP) ................................. 2006-303130
Nov. 7, 2007 (JP) ................................. 2007-289385

(51) Int. Cl.
*B60T 8/34* (2006.01)
*B60T 8/44* (2006.01)
*B60T 8/88* (2006.01)

(52) U.S. Cl. .............. 303/113.5; 303/122.04; 303/114.1

(58) Field of Classification Search ............... 303/113.1, 303/114.1, 116.1, 116.2, 122.04, 122.05, 303/113.5, 115.4, 115.5, 188
See application file for complete search history.

(56) References Cited

U.S. PATENT DOCUMENTS

| | | | |
|---|---|---|---|
| 5,397,175 A * | 3/1995 | Matsunaga et al. | 303/117.1 |
| 6,249,736 B1 * | 6/2001 | Schmidt et al. | 701/70 |
| 6,412,882 B1 | 7/2002 | Isono et al. | |
| 6,854,813 B2 * | 2/2005 | Yokoyama et al. | 303/122.04 |
| 6,908,160 B2 * | 6/2005 | Kusano | 303/114.1 |
| 2002/0180262 A1 * | 12/2002 | Hara et al. | 303/119.1 |

FOREIGN PATENT DOCUMENTS

| | | |
|---|---|---|
| DE | 103 07 854 A1 | 9/2004 |
| DE | 600 11 985 T2 | 7/2005 |
| JP | 63 159169 | 7/1988 |
| JP | 2001 225739 | 8/2001 |
| JP | 2005 153555 | 6/2005 |

* cited by examiner

*Primary Examiner* — Bradley King
*Assistant Examiner* — Vishal Sahni
(74) *Attorney, Agent, or Firm* — Oblon, Spivak, McClelland, Maier & Neustadt, L.L.P.

(57) ABSTRACT

A brake system for a vehicle including a master cylinder in which a front pressure chamber and a rear pressure chamber are defined by movably supporting an input piston and a pressure piston in a cylinder. A high-pressure supply pipe of an accumulator is coupled to wheel cylinders via hydraulic supply pipes, and coupled to the rear pressure chamber via a hydraulic supply pipe and a second hydraulic pipe. Pressure booster valves and pressure reducing valves are attached to the hydraulic pressure supply pipes, respectively. The wheel cylinder is coupled to the front pressure chamber via the first hydraulic pipe, and a coupling pipe for coupling a first hydraulic pipe and the hydraulic supply pipe is provided with the switching valve.

16 Claims, 6 Drawing Sheets

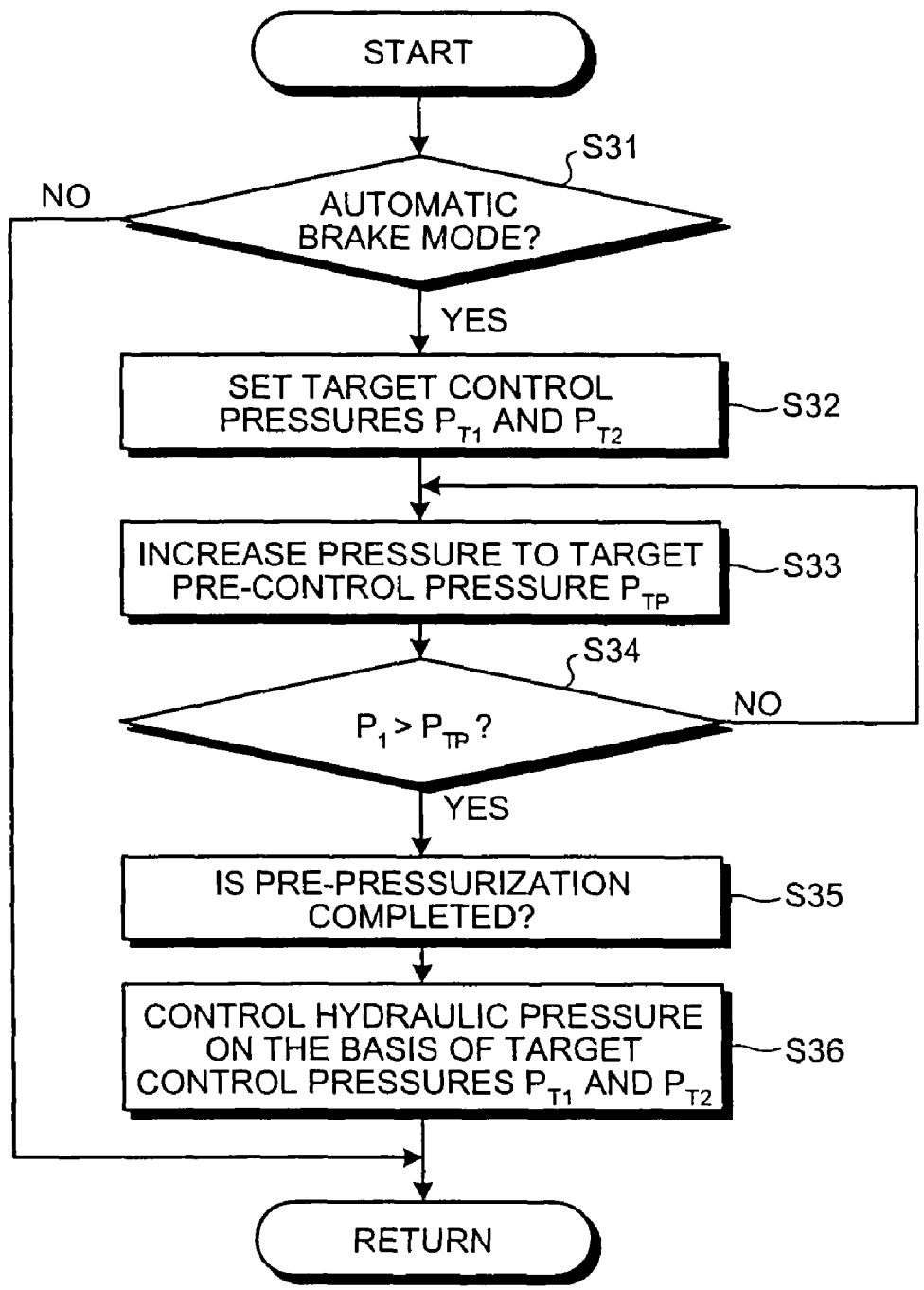

BRAKE SYSTEM FOR VEHICLE

TECHNICAL FIELD

The present invention relates to a brake system for a vehicle for electronically controlling a braking force applied to the vehicle in accordance with a brake operation of an occupant.

BACKGROUND ART

As a brake system for a vehicle or an electronically-controlled brake system for electrically controlling a braking force of the brake system in accordance with a brake operation force, an operation amount, or the like input from a brake pedal, that is, the hydraulic pressure supplied to a wheel cylinder for driving the brake system, an ECB (Electronically Controlled Brake) for controlling a braking force by a hydraulic pressure accumulated in an accumulator is known.

In the ECB, the hydraulic pressure boosted by a pump is accumulated in the accumulator and adjusted in accordance with a brake request of the driver, and the resultant pressure is supplied to the wheel cylinder as the brake system. When the driver operates the brake pedal, a master cylinder generates a hydraulic pressure according to the operation amount. A part of the hydraulic fluid flows in a stroke simulator, and the operation amount of the brake pedal is adjusted in accordance with the pedal effort (operation force) on the brake pedal. On the other hand, a brake ECU sets a target reduction speed of the vehicle in accordance with a pedal stroke, determines distribution of braking forces to be applied to the wheels, and applies a predetermined hydraulic pressure from the accumulator to each of the wheel cylinders.

The ECB sets a proper braking hydraulic pressure according to the brake operation input from the brake pedal and supplies a proper hydraulic pressure from the accumulator to each of the wheel cylinders, thereby electrically controlling the braking force. Consequently, when a power supply unit fails, a proper hydraulic pressure cannot be supplied to the wheel cylinders. A master cut valve is therefore provided between a master cylinder and each of the wheel cylinders. When the power supply unit fails, the master cut valve is opened to apply the pressure force from the master cylinder directly to the wheel cylinders, thereby assuring the braking force.

As such a brake system for a vehicle, for example, there is one disclosed in Patent Document 1.

Patent Document 1: Japanese Unexamined Patent Application Publication No. 2001-225739 (U.S. Pat. No. 6,412,882 B1, Jul. 2, 2002)

DISCLOSURE OF INVENTION

Problem to be Solved by the Invention

In the case of enabling braking forces of the four wheels to be independently controlled by applying a pressure individually to wheel cylinders of the front and rear four wheels in the ECB, since there are four systems of pressurization lines, two systems of master cut valves are necessary. It makes the structure complicated and causes increase in the manufacture cost. In an assist control of a backup system or a hydrobooster when a power supply unit fails, a change in the specifications caused by variations in the control pressure to the wheel cylinders of the right and left wheels has to be dealt. From this point as well, the structure is complicated and the manufacture cost increases.

The present invention has been achieved to solve such a problem and an object of the invention is to provide a brake system for a vehicle realizing improvement in reliability and safety by assuring a proper braking force even when a power supply unit fails while simplifying a structure and lowering cost.

Means for Solving Problem

To solve the problems as described above and to achieve an object, a brake system for a vehicle, includes an operation member on which a braking operation is performed by an occupant, a master cylinder in which a front pressure chamber and a rear pressure chamber are defined by movably supporting a drive piston in a cylinder and which can output a hydraulic pressure in the front pressure chamber by moving the drive piston by the operation member, control pressure setting unit setting a target control pressure according to an operation force input from the operation member to the drive piston, a hydraulic pressure supply source, first and second wheel cylinders coupled to the front pressure chamber and generating a braking force to wheels, a first pressure control valve capable of adjusting a hydraulic pressure from the hydraulic pressure supply source on the basis of the target control pressure and outputting the adjusted hydraulic pressure to the first wheel cylinder, a second pressure control valve capable of adjusting a hydraulic pressure from the hydraulic pressure supply source on the basis of the target control pressure and outputting the adjusted hydraulic pressure to the rear pressure chamber, and a switching valve capable of making the first and second wheel cylinders communicated with each other or interrupted from each other.

In the brake system for a vehicle according to one aspect of the present invention, the first and second wheel cylinders are wheel cylinders for generating a braking force to right and left front wheels.

In the brake system for a vehicle according to another aspect of the present invention, the hydraulic pressure supply source has an accumulator.

The brake system for a vehicle according to another aspect of the present invention, further includes third and fourth wheel cylinders coupled to the hydraulic pressure supply source and generating a braking force to right and left rear wheels, and third and fourth pressure control valves capable of adjusting a hydraulic pressure from the hydraulic pressure supply source on the basis of the target control pressure and outputting the adjusted hydraulic pressure to the third and fourth wheel cylinders.

In the brake system for a vehicle according to another aspect of the present invention, the drive piston has an input piston and a pressure piston disposed in series in a cylinder, an operation force of the operation member can be input to the input piston, the front pressure chamber is defined in front of the pressure piston, and the rear pressure chamber is defined between the input piston and the pressure piston.

In the brake system for a vehicle according to another aspect of the present invention, a hydraulic line capable of adjusting a hydraulic pressure from the hydraulic pressure supply source and outputting the adjusted hydraulic pressure to the first wheel cylinder is provided with a power separating mechanism in series with the first pressure control valve.

The brake system for a vehicle according to another aspect of the present invention further includes a coupling line for coupling the first and second wheel cylinders while bypassing the power separating mechanism, wherein the coupling line is provided with the switching valve.

In the brake system for a vehicle according to another aspect of the present invention, the switching valve can make the first and second wheel cylinders communicated with each other or interrupted from each other in accordance with the hydraulic pressure adjusted by the first pressure control valve.

In the brake system for a vehicle according to another aspect of the present invention, the switching valve can make the first and second wheel cylinders communicated with each other or interrupted from each other in accordance with the hydraulic pressure acting on a power separating mechanism.

In the brake system for a vehicle according to another aspect of the present invention, communication between the first and second wheel cylinders is interrupted by making a pre-hydraulic pressure act on the power separating mechanism by the first pressure control valve and, after that, the hydraulic pressure from the hydraulic pressure supply source is adjusted by the first and second pressure control valves on the basis of the target control pressure.

In the brake system for a vehicle according to another aspect of the present invention, when current is passed, the switching valve makes the first and second wheel cylinders interrupted, and when a control pressure of any of the first and second wheel cylinders is lower than the target control pressure by a preset specific value or more, the switching valve makes the first and second wheel cylinders communicated with each other.

In the brake system for a vehicle according to another aspect of the present invention, when control pressures of both of the first and second wheel cylinders are lower than the target control pressure by the preset specific value or more, the switching valve makes the first and second wheel cylinders interrupted.

Effect of the Invention

A brake system for a vehicle of the present invention includes: a master cylinder in which a front pressure chamber and a rear pressure chamber are defined by movably supporting a drive piston in a cylinder and which can output a hydraulic pressure in the front pressure chamber by moving the drive piston by an operation member; first and second wheel cylinders coupled to the front pressure chamber and generating a braking force to wheels; a first pressure control valve capable of adjusting a hydraulic pressure from a hydraulic pressure supply source on the basis of a target control pressure and outputting the adjusted hydraulic pressure to the first wheel cylinder; a second pressure control valve capable of adjusting a hydraulic pressure from the hydraulic pressure supply source on the basis of the target control pressure and outputting the adjusted hydraulic pressure to the rear pressure chamber; and a switching valve capable of making the first and second wheel cylinders communicated with each other or interrupted from each other.

Therefore, when a power supply unit is normal, the first and second wheel cylinders are interrupted from each other by the switching valve. The first pressure control valve adjusts the hydraulic pressure from the hydraulic pressure supply source on the basis of the target control pressure and outputs the adjusted hydraulic pressure to the first wheel cylinder. The second pressure control valve adjusts the hydraulic pressure from the hydraulic pressure supply source on the basis of the target control pressure, and outputs the adjusted hydraulic pressure to the rear pressure chamber to assist the pressure piston so that the hydraulic pressure in the front pressure chamber is output to the second wheel cylinder. In such a manner, the wheel cylinders can apply a proper braking force to the wheels. On the other hand, when the power supply unit fails, the first and second wheel cylinders are communicated with each other by the switching valve. The drive piston is moved by the operation of the operation member, thereby pressurizing the front pressure chamber. The generated hydraulic pressure is output to the first and second wheel cylinders. As a result, the wheel cylinders can apply a proper braking force to the wheels and the proper braking force is assured always. Thus, improvement in the reliability and safety can be achieved, and simplification in structure and lower cost can be also realized.

BRIEF DESCRIPTION OF DRAWINGS

FIG. 6 is a flowchart showing automatic braking force control in the brake system for a vehicle according to the fifth embodiment.

EXPLANATION OF LETTERS OR NUMERALS

Figure 1:
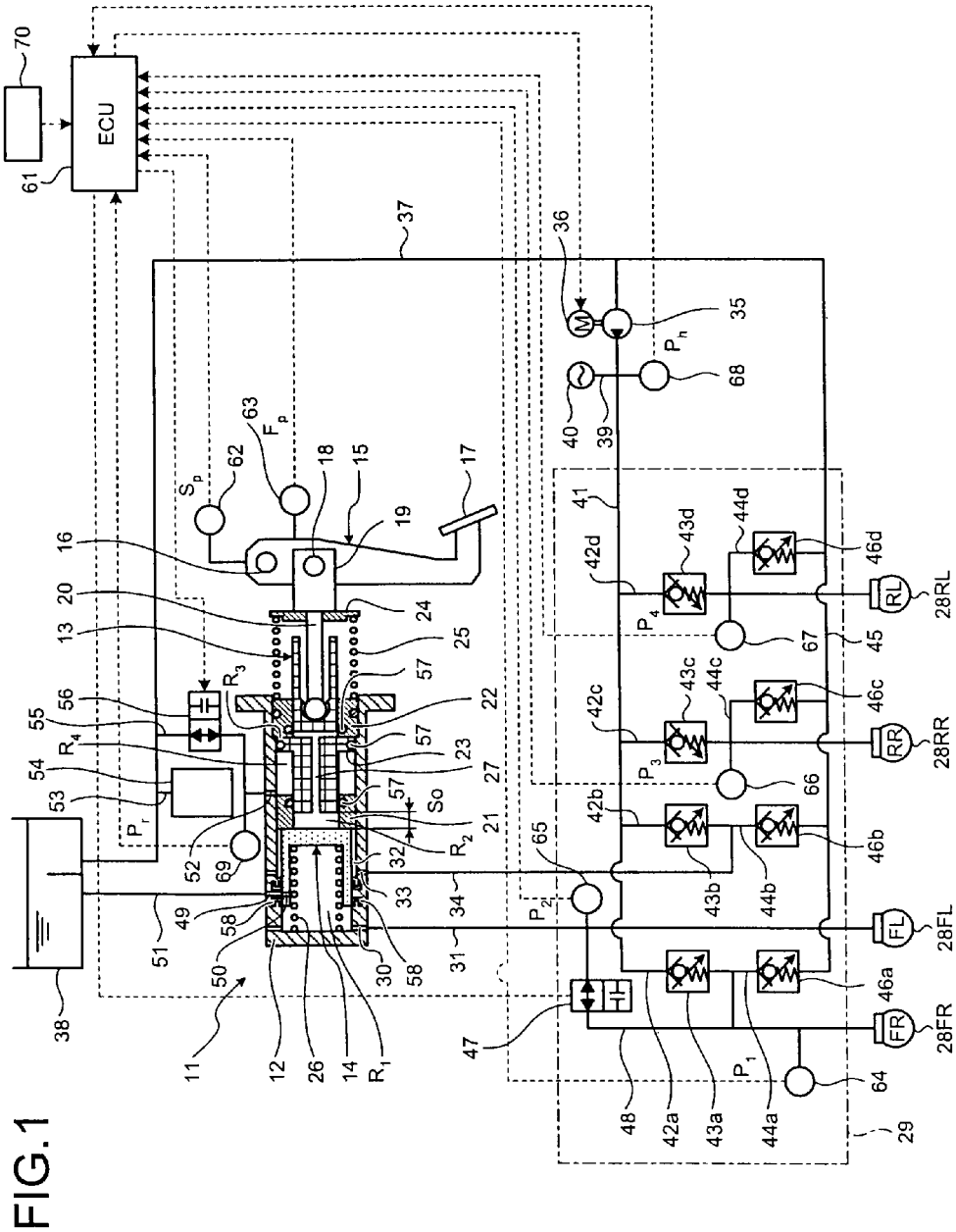
FIG. 1 is a schematic configuration diagram showing a brake system for a vehicle according to a first embodiment of the present invention.

11 master cylinder
12 cylinder
13 input piston
14 pressure piston
15 brake pedal (operation member)
20 operation rod
25 reaction force spring
26 energization spring
28FR, 28FL, 28RR, 28RL wheel cylinders
29 ABS
31 first hydraulic pipe
34 second hydraulic pipe
35 hydraulic pump (hydraulic pressure supply source)
38 reservoir tank
40 accumulator (hydraulic pressure supply source)
41 high-pressure supply pipe
43a, 43b, 43c, 43d booster valves (pressure control valves)
45 third hydraulic pressure pipe
46a, 46b, 46c, 46d pressure reducing valves (pressure control valves)
47, 81 switching valves
48 coupling pipe (coupling line)
54 stroke simulator
56 open/close valve
61 electronic control unit, ECU (control pressure setting unit)
62 stroke sensor
63 pedal effort sensor
64 first pressure sensor
65 second pressure sensor
66 third pressure sensor
67 fourth pressure sensor
68, 69 pressure sensors 71 power separating mechanism
91 power separating switching valve
$R_1$ front pressure chamber
$R_2$ rear pressure chamber
$R_3$ circulating pressure chamber
$R_4$ reaction force chamber

BEST MODES FOR CARRYING OUT THE INVENTION

Embodiments of a brake system for a vehicle of the present invention will be described in detail hereinbelow with reference to the drawings. The present invention is not limited to the embodiments.

First Embodiment

FIG. 1 is a schematic configuration diagram showing a brake system for a vehicle according to a first embodiment of the invention.

In the brake system for a vehicle of the first embodiment, as shown in FIG. 1, a master cylinder 11 is constructed so that an input piston 13 and a pressure piston 14 as drive pistons are supported movably in the axial direction in a cylinder 12. The cylinder 12 has a cylindrical shape whose proximal end is open and whose distal end is closed. On the inside, the input piston 13 and the pressure piston 14 are coaxially disposed and supported movably in the axial direction.

The upper end of a brake pedal 15 as an operation member is swingably supported by a support shaft 16 to an attachment bracket of a not-shown vehicle body. A pedal 17 which can be stepped on by the driver is attached to the lower end of the brake pedal 15. A clevis 19 is attached to an intermediate part of the brake pedal 15 by a coupling shaft 18. To this clevis 19 is coupled the proximal end of an operation rod 20. The distal end of the operation rod 20 of the brake pedal 15 is coupled to the proximal end of the input piston 13 disposed at the proximal end side of the cylinder 12.

The input piston 13 is movably supported by the inner peripheral faces of front and rear cylindrical-shaped support members 21 and 22 whose outer peripheral faces are fixedly fit or screwed in the inner peripheral face of the cylinder 12. A disc-shaped flange 23 is movably supported in the inner peripheral face of the cylinder 12. The flange 23 comes into contact with the support members 21 and 22, thereby regulating the stroke of the input piston 13. The input piston 13 is energized and supported in a position where the flange 23 comes into contact with the support member 22 by a reaction force spring 25 stretched between the support member 22 and a bracket 24 of the brake pedal 15.

The pressure piston 14 disposed at the distal end side of the cylinder 12 has a U shape in cross section, and its outer peripheral face is movably supported by the inner peripheral face of the cylinder 12. The front and rear end faces of the pressure piston 14 come into contact with the cylinder 12 and the support member 21, thereby regulating the stroke of the pressure piston 14 and energizing and supporting the pressure piston 14 in a position where the pressure piston 14 comes into contact with the support member 21 by an energization spring 26 stretched between the pressure piston 14 and the cylinder 12. In this case, the distal end face of the input piston 13 and the proximal end face of the pressure piston 14 are held in a state where they are apart from each other with a predetermined interval (stroke) $S_0$.

When the driver steps on the pedal 17 and the brake pedal 15 is turned, the operation force is transmitted to the input piston 13 via the operation rod 20, and the input piston 13 can move forward against the energization force of the reaction force spring 25. When the input piston 13 moves forward by the predetermined stroke $S_0$, the input piston 13 comes into contact with the pressure piston 14 and can press it, and the input piston 13 and the pressure piston 14 can move integrally forward.

The input piston 13 and the pressure piston 14 are coaxially movably disposed in the cylinder 12 as described above, so that a front pressure chamber $R_1$ is defined in the forward direction (left in FIG. 1) of the pressure piston 14, a rear pressure chamber $R_2$ is defined in the backward direction (right in FIG. 1) in the pressure piston 14, that is, between the input piston 13 and the pressure piston 14, and a circulating pressure chamber $R_3$ is defined in the backward direction (right in FIG. 1) in the input piston 13, that is, between the input piston 13 and the support member 22. A reaction force chamber $R_4$ is formed between the support member 21 and the flange 23 of the input piston 13. The rear pressure chamber $R_2$ and the circulating pressure chamber $R_3$ are communicated with each other via a communication path 27 formed in the input piston 13.

On the other hand, front wheels FR and FL and rear wheels RR and RL are provided with wheel cylinders 28FR, 28FL, 28RR, and 28RL for operating a brake system, and can be operated by an ABS (Antilock Brake System) 29. In the embodiment, the wheel cylinders 28FR and 28FL of the front wheels FR and FL correspond to first and second wheel cylinders of the present invention, and the wheel cylinders 28RR and 28RL of the rear wheels RR and RL correspond to third and fourth wheel cylinders of the present invention.

To a first pressure port 30 communicated with the front pressure chamber $R_1$ of the master cylinder 11, one end of a first hydraulic pipe 31 is coupled. The other end of the first hydraulic pipe 31 is coupled to the wheel cylinder 28FL of the front wheel FL. One end of a second hydraulic pipe 34 is coupled to a second pressure port 33 communicated with the rear pressure chamber $R_2$ of the master cylinder 11 via an annular coupling path 32.

A hydraulic pump 35 can be driven by a motor 36 and is coupled to a reservoir tank 38 via a pipe 37 and coupled to an accumulator 40 via a pipe 39. Therefore, when the motor 36 is driven, the hydraulic pump 35 can boost pressure by supplying hydraulic fluid stored in the reservoir tank 38 to the accumulator 40, and the accumulator 40 can store the hydraulic fluid of predetermined pressure. In the embodiment, a hydraulic supply source is constructed by the hydraulic pump 35 and the accumulator 40.

The proximal end of a high-pressure supply pipe 41 is coupled to the accumulator 40, and the distal end of the high-pressure supply pipe 41 is branched to four hydraulic supply pipes 42a, 42b, 42c, and 42d. The distal end of the first hydraulic supply pipe 42a is coupled to the wheel cylinder 28FR of the front wheel FR, the distal end of the third hydraulic supply pipe 42c is coupled to the wheel cylinder 28RR of the rear wheel RR, and the distal end of the fourth hydraulic supply pipe 42d is coupled to the wheel cylinder 28RL of the rear wheel RL. Electromagnetic pressure booster valves 43a, 43b, 43c, and 43d are disposed in the hydraulic supply pipes 42a, 42b, 42c, and 42d, respectively. The pressure booster valves 43a, 43b, 43c, and 43d are electromagnetic open/close valves of the normal open type and are closed when power is supplied.

Hydraulic exhaust pipes 44a, 44b, 44c, and 44d are coupled on the downstream side of the pressure booster valves 43a, 43b, 43c, and 43d in the hydraulic supply pipes 42a, 42b, 42c, and 42d, and the hydraulic exhaust pipes 44a, 44b, 44c, and 44d are coupled to the pipe 37 via a third hydraulic pipe 45. Electromagnetic pressure reducing valves 46a, 46b, 46c, and 46d are disposed in the hydraulic exhaust pipes 44a, 44b, 44c, and 44d, respectively. One end of the second hydraulic pipe 34 is communicated with the rear pressure chamber $R_2$ in the master cylinder 11 via the second pressure port 33 and the coupling path 32, and the other end is coupled to a coupling part between the hydraulic supply pipe 42b and the hydraulic exhaust pipe 44b, that is, between the second pressure booster valve 43b and the second pressure reducing valve 46b. The pressure reducing valves 46a, 46b, 46c, and 46d are electromagnetic open/close valves of the normal close type and are open when power is supplied.

A switching valve 47 capable of making the wheel cylinders 28FR and 28FL in the front wheel FR communicated with each other or interrupted from each other is disposed in a coupling pipe 48 for coupling the first hydraulic pipe 31 and the first hydraulic supply pipe 42a. The switching valve 47 is a normal-open-type electromagnetic open/close valve and is closed when power is supplied.

In the embodiment, a first pressure control valve of the invention is constructed by the first pressure booster valve 43a and the first pressure reducing valve 46a. The hydraulic pressure from the accumulator 40 is adjusted, and the adjusted pressure can be output to the wheel cylinder 28FR of the front wheel FR. A second pressure control valve of the present invention is constructed by the second pressure booster valve 43b and the second pressure reducing valve 46b. The hydraulic pressure from the accumulator 40 is adjusted, and the adjusted pressure can be output to the rear pressure chamber $R_2$ in the master cylinder 11 via the second hydraulic pipe 34. By assisting the pressure piston 14, the hydraulic pressure in the front pressure chamber $R_1$ can be output to the wheel cylinder 28FL of the front wheel FL via the first hydraulic pipe 31. Further, a third pressure control valve of the present invention is constructed by the third pressure booster valve 43c and the third pressure reducing valve 46c. The hydraulic pressure from the accumulator 40 is adjusted, and the adjusted pressure can be output to the wheel cylinder 28RR of the rear wheel RR. A fourth pressure control valve of the present invention is constructed by the fourth pressure booster valve 43d and the fourth pressure reducing valve 46d. The hydraulic pressure from the accumulator 40 is adjusted, and the adjusted pressure can be output to the wheel cylinder 28RL of the rear wheel RL.

In the front pressure chamber $R_1$ in the master cylinder 11, auxiliary ports 49 and 50 are formed so as to penetrate the cylinder 12 and the pressure piston 14. The auxiliary ports 49 and 50 are coupled to the reservoir tank 38 via a hydraulic pipe 51.

A reaction force port 52 communicated with the reaction force chamber $R_4$ is formed in the cylinder 12 in the master cylinder 11. The reaction force port 52 and the pipe 37 communicated with the reservoir tank 38 are coupled to each other via a coupling pipe 53, and a stroke simulator 54 is disposed in the coupling pipe 53. The stroke simulator 54 generates a pedal stroke according to the operation amount on the brake pedal 15 of the driver.

By applying pressure to the reaction force chamber $R_4$ in the master cylinder 11, an operation reaction force can be applied to the driver via the brake pedal 15. A bypass pipe 55 for bypassing the stroke simulator 54 is provided between the coupling pipe 53 and the pipe 37, and an open/close valve 56 is disposed in the bypass pipe 55. The open/close valve 56 is an electromagnetic open/close valve of a normal open type and is closed when power is supplied.

An O ring 57 and also a one-way seal 58 are attached to a main part such as the cylinder 12, the input piston 13, the pressure piston 14, and the like, thereby preventing leakage of hydraulic pressure.

In the brake system for a vehicle of the embodiment constructed as described above, an electronic control unit (ECU) 61 sets a target control pressure according to an operation force (pedal effort) input from the brake pedal 15 to the input piston 13 and controls the pressure booster valves 43a, 43c, and 43d and the pressure reducing valves 46a, 46c, and 46d on the basis of the set target control pressure, thereby applying a braking hydraulic pressure to each of the wheel cylinders 28FR, 28RR, and 28RL via the ABS 29. In addition, by controlling the second pressure booster valve 43b and the second pressure reducing valve 46b, the control pressure is made to act on the rear pressure chamber $R_2$ in the master cylinder 11 to assist the pressure piston 14, and the braking hydraulic pressure is output from the front pressure chamber $R_1$ and is applied to the wheel cylinder 28FL via the ABS 29, thereby making the braking force act on the front wheels FR and FL and the rear wheels RR and RL.

Specifically, the brake pedal 15 is provided with a stroke sensor 62 for detecting a pedal stroke Sp of the brake pedal 15, and a pedal effort sensor 63 for detecting a pedal effort Fp, and outputs the detection results to the ECU 61. The first hydraulic supply pipe 42a is provided with a first pressure sensor 64 for detecting hydraulic pressure. The first pressure sensor 64 detects a control pressure $P_1$ supplied to the wheel cylinder 28FR of the front wheel FR, and outputs the detection result to the ECU 61. The first hydraulic pipe 31 is provided with a second pressure sensor 65 for detecting hydraulic pressure. The second pressure sensor 65 detects a control pressure $P_2$ supplied from the front pressure chamber $R_1$ of the master cylinder 11 to the wheel cylinders 28FL of the front wheel FL, and outputs the detection results to the ECU 61.

Further, the third and fourth hydraulic supply pipes 42c and 42d are provided with third and fourth pressure sensors 66 and 67 for detecting hydraulic pressure, respectively.

The third and fourth pressure sensors 66 and 67 detect control pressures $P_3$ and $P_4$ supplied to the wheel cylinders 28RR and 28RL of the rear wheels RR and RL and output detection results to the ECU 61.

Further, the high-pressure supply pipe 41 extending from the accumulator 40 to the hydraulic supply pipes 42a, 42b, 42c, and 42d is provided with a pressure sensor 68 for detecting hydraulic pressure. The pressure sensor 68 detects a hydraulic pressure $P_h$ accumulated in the accumulator 40 and outputs a detection result to the ECU 61. In this case, when the hydraulic pressure $P_h$ accumulated in the accumulator 40 detected by the pressure sensor 68 is lower than a preset pressure, the ECU 61 drives the motor 36 to operate the hydraulic pump 35, thereby boosting the pressure accumulated in the accumulator 40. A pressure sensor 69 for detecting the hydraulic pressure is provided between the reaction force port 52 and the stroke simulator 54 in the coupling pipe 53.

The pressure sensor 69 detects a reaction force hydraulic pressure $P_T$ acting on the reaction force chamber $R_4$ by the stroke simulator 54 and outputs the detection result to the ECU 61. Each of the front wheels FR and FL and the rear wheels RR and RL is provided with a wheel speed sensor 70, and detected wheel speeds are output to the ECU 61.

Therefore, the ECU 61 sets a target control pressure $P_T$ on the basis of the pedal effort Fp of the brake pedal 15 detected by the pedal effort sensor 63 (or the pedal stroke Sp detected by the stroke sensor 62) and controls the pressure booster valves 43a, 43b, 43c, and 43d and the pressure reducing valves 46a, 46b, 46c, and 46d. On the other hand, the ECU 61 feeds back the control pressures $P_1$, $P_2$, $P_3$, and $P_4$ detected by the pressure sensors 64, 65, 66, and 67 and controls so that the target control pressure $P_T$ and the control pressures $P_1$, $P_2$, $P_3$, and $P_4$ match each other. In this case, the ECU 61 individually controls the pressure booster valves 43a, 43b, 43c, and 43d and the pressure reducing valves 46a, 46b, 46c, and 46d in accordance with the travel state of the vehicle, thereby independently pressurizing the wheel cylinders 28FR, 28FL, 28RR, and 28RL and adjusting the braking force of the front wheels FR and FL and the rear wheels RR and RL.

The reaction force given to the brake pedal 15 at this time is a sum of the spring force of the reaction force spring 25 and the reaction force hydraulic pressure $P_r$ acting on the reaction force chamber $R_4$. In this case, the spring force is constant at a value determined by the specifications of the spring, and the reaction force hydraulic pressure $P_r$ is set by the stroke simulator 54.

A braking force control in the brake system for a vehicle in the embodiment will be described specifically. When an occupant steps on the brake pedal 15, the input piston 13 moves forward by the operation force. The pressure piston 14 moves forward with the predetermined stroke $S_0$ maintained, the hydraulic pressure of the rear pressure chamber $R_2$ flows in the circulating pressure chamber $R_3$ via the communication path 27, the input piston 13 enters a free state, and the hydraulic pressure in the rear pressure chamber $R_2$ does not act as a reaction force on the brake pedal 15 via the input piston 13.

The pedal effort sensor 63 detects the pedal effort Fp, and the ECU 61 sets the target control pressure $P_T$ on the basis of the pedal effort Fp. The ECU 61 controls the pressure booster valves 43a, 43b, 43c, and 43d and the pressure reducing valves 46a, 46b, 46c, and 46d on the basis of the target control pressure $P_T$ to control the braking hydraulic pressure of each of the wheel cylinders 28FR, 28FL, 28RR, and 28RL of the front wheels FR and FL and the rear wheels RR and RL.

In the case where the power supply system operates normally, the coupling pipe 48 is closed by the switching valve 47, and the bypass pipe 55 is closed by the open/close valve 56. The ECU 61 increases or decreases the hydraulic pressure from the accumulator 40 by controlling the first pressure booster valve 43a and the first pressure reducing valve 46a on the basis of the target control pressure $P_T$, outputs the resultant hydraulic pressure to the wheel cylinder 28FR of the front wheel FR, and feeds back the control pressure $P_1$ detected by the first pressure sensor 64. The ECU 61 increases or decreases the hydraulic pressure from the accumulator 40 by controlling the second pressure booster valve 43b and the second pressure reducing valve 46b on the basis of the target control pressure $P_T$, and outputs the resultant hydraulic pressure to the rear pressure chamber $R_2$ in the master cylinder 11 via the second hydraulic pressure pipe 34. In the master cylinder 11, the pressure piston 14 is assisted by applying/reducing pressure to/in the rear pressure chamber $R_2$. The front pressure chamber $R_1$ is pressurized, the resultant hydraulic pressure is output to the wheel cylinder 28FL of the front wheel FL via the first hydraulic pipe 31, and the control pressure $P_2$ detected by the second pressure sensor 65 is fed back.

Further, the ECU 61 increases or decreases the hydraulic pressure from the accumulator 40 by controlling the third and fourth pressure booster valves 43c and 43d and the third and fourth pressure reducing valves 46c and 46d on the basis of the target control pressure $P_T$, outputs the resultant hydraulic pressure to the wheel cylinders 28RR and 28RL of the rear wheels RR and RL, and feeds back the control pressures $P_3$ and $P_4$ detected by the third and fourth pressure sensors 66 and 67.

Therefore, the hydraulic pressure from the accumulator 40 is output as the braking hydraulic pressure via the pressure booster valves 43a, 43c, and 43d and the pressure reducing valves 46a, 46c, and 46d to the wheel cylinders 28FR, 28RR, and 28RL, and the hydraulic pressure from the accumulator 40 is output to the rear pressure chamber $R_2$ in the master cylinder 11 via the pressure booster valve 43b and the pressure reducing valve 46b to assist the pressure piston 14, thereby pressurizing the front pressure chamber R. The resultant hydraulic pressure is output from the front pressure chamber $R_1$ as a braking hydraulic pressure to the wheel cylinder 28FL via the first hydraulic pipe 31. Consequently, in the ABS 29, the braking hydraulic pressures of the wheel cylinders 28FR, 28FL, 28RR, and 28RL of the front wheels FR and FL and the rear wheels RR and RL are individually adjusted and applied. Thus, the braking force according to the operation force on the brake pedal 15 of the occupant can be generated for the front wheels FR and FL and the rear wheels RR and RL.

In the case where a failure occurs in the power supply system, by electrically controlling the pressure booster valves 43a, 43b, 43c, and 43d and the pressure reducing valves 46a, 46b, 46c, and 46d, the braking hydraulic pressure applied to the wheel cylinders 28FR, 28FL, 28RR, and 28RL cannot be controlled to proper hydraulic pressure. In the embodiment, the front pressure chamber $R_1$ in the master cylinder 11 and the wheel cylinder 28FL are directly coupled to each other via the first hydraulic pipe 31, and the coupling pipe 48 for coupling the first hydraulic pipe 31 and the first hydraulic supply pipe 42a is provided with the switching valve 47 of the normal open type.

At the time of a failure in the power supply system, when an occupant steps on the brake pedal 15 in a state where the coupling pipe 48 is opened by the switching valve 47 and the bypass pipe 55 is opened by the open/close valve 56, the input piston 13 moves forward by the operation force by the predetermined stroke $S_0$. The input piston 13 comes into contact with the pressure piston 14, and the pistons 13 and 14 move forward integrally. The front pressure chamber $R_1$ is pressurized, so that the hydraulic pressure in the front pressure chamber $R_1$ is discharged to the first hydraulic pipe 31. The hydraulic pressure discharged to the first hydraulic pipe 31 is applied as the braking hydraulic pressure to the wheel cylinder 28FL of the front wheel FL via the first hydraulic pipe 31, and applied as the baking hydraulic pressure to the wheel cylinder 28FR of the front wheel FR via the coupling pipe 48 and the first hydraulic supply pipe 42a. Therefore, the braking force according to the operation force on the brake pedal 15 of the occupant can be generated to the front wheels FR and FL.

As described above, the brake system for a vehicle of the first embodiment is provided with the master cylinder 11 in which the front pressure chamber $R_1$ and the rear pressure chamber $R_2$ are defined by movably supporting the input piston 13 and the pressure piston 14 in series in the cylinder 12 and which can output the hydraulic pressure in the front pressure chamber $R_1$ via the pressure piston 14 by moving the input piston 13 with the brake pedal 15. The high-pressure supply pipe 41 of the accumulator 40 is coupled to the wheel cylinders 28FR, 28RR, and 28RL via the hydraulic supply pipes 42a, 42c, and 42d, respectively, and coupled to the rear pressure chamber $R_2$ via the hydraulic supply pipe 42b and the second hydraulic pipe 34. The pressure booster valves 43a, 43b, 43c, and 43d and the pressure reducing valves 46a, 46b, 46c, and 46d are attached to the hydraulic supply pipes 42a, 42b, 42c, and 42d, respectively. The wheel cylinder 28FL is coupled to the front pressure chamber $R_1$ via the first hydraulic pipe 31, and the coupling pipe 48 that couples the first hydraulic pipe 31 and the hydraulic supply pipe 42a is provided with the switching valve 47.

Therefore, when the power supply system is normal, the ECU 61 sets the target control pressure $P_T$ according to the pedal effort Fp and controls the pressure booster valves 43a, 43c, and 43d and the first pressure reducing valves 46a, 46c, and 46d on the basis of the target control pressure $P_T$, thereby adjusting the hydraulic pressure from the accumulator 40, and outputs the hydraulic pressure to the wheel cylinder 28FR of the front wheel FR and the wheel cylinders 28RR and 28RL of the rear wheels RR and RL. By controlling the second pressure booster valve 43b and the second pressure reducing valve 46b, the hydraulic pressure from the accumulator 40 is adjusted. The adjusted hydraulic pressure is output to the rear pressure chamber $R_2$ via the second hydraulic pipe 34 to assist the pressure piston 14. The hydraulic pressure pressurizing the front pressure chamber $R_1$ is output to the wheel cylinder 28FL of the front wheel FL via the first hydraulic pipe 31, and a proper control pressure is made to act on each of the wheel cylinders 28FR, 28FL, 28RR, and 28RL. As a result, proper braking force according to the operation force of the brake pedal 15 of the occupant can be generated for the front wheels FR and FL and the rear wheels RR and RL.

On the other hand, when a failure occurs in the power supply system, the coupling pipe 48 for coupling the first hydraulic pipe 31 and the hydraulic supply pipe 42a is opened by the switching valve 47. According to an operation on the brake pedal 15, the input piston 13 and the pressure piston 14 move integrally, and the front pressure chamber $R_1$ is pressurized, and the hydraulic pressure in the front pressure chamber $R_1$ is output to the wheel cylinder 28FL of the front wheel FL via the first hydraulic pipe 31, and the hydraulic pressure in the front pressure chamber $R_1$ is output to the wheel cylinder 28FR of the front wheel FR via the first hydraulic pipe 31, the coupling pipe 48, and the first hydraulic supply pipe 42a. The braking hydraulic pressure acts on the wheel cylinders 28FR, 28FL, 28RR, and 28RL, and proper braking force according to the operation force on the brake pedal 15 of the occupant can be generated to the front wheels FR and FL and the rear wheels RR and RL.

In the embodiment, the wheel cylinder 28FR of the front wheel FR is coupled to the front pressure chamber $R_1$ in the master cylinder 11 via the first hydraulic pipe 31, the hydraulic supply pipe 42a is coupled to the first hydraulic pipe 31 via the coupling pipe 48a, the wheel cylinder 28FL of the front wheel FL is coupled to the hydraulic supply pipe 42a, and the switching valve 47 of the normal open type is provided for the coupling pipe 48. Therefore, with the simple configuration, the proper braking hydraulic pressure when the power supply system is normal and that when the power supply system fails can be assured. The structure can be simplified and the manufacture cost can be reduced.

In the embodiment as described above, when the power supply system is normal, by controlling the pressure booster valves 43a, 43c, and 43d and the first pressure reducing valves 46a, 46c, and 46d on the basis of the target control pressure $P_T$, the hydraulic pressure according to the operation on the brake pedal 15 of the occupant can be generated reliably. On the other hand, when the power supply system fails, the static pressure of the master cylinder 11 is allowed to act directly on the wheel cylinders 28FR and 28FL, thereby enabling the hydraulic pressure according to the operation on the brake pedal 15 of the occupant to be reliably generated. As a result, the hydraulic path is simplified and the structure can be simplified, and the manufacture cost can be reduced. On the other hand, proper braking force control can be performed, and reliability and safety can be improved.

Second Embodiment

Figure 2:
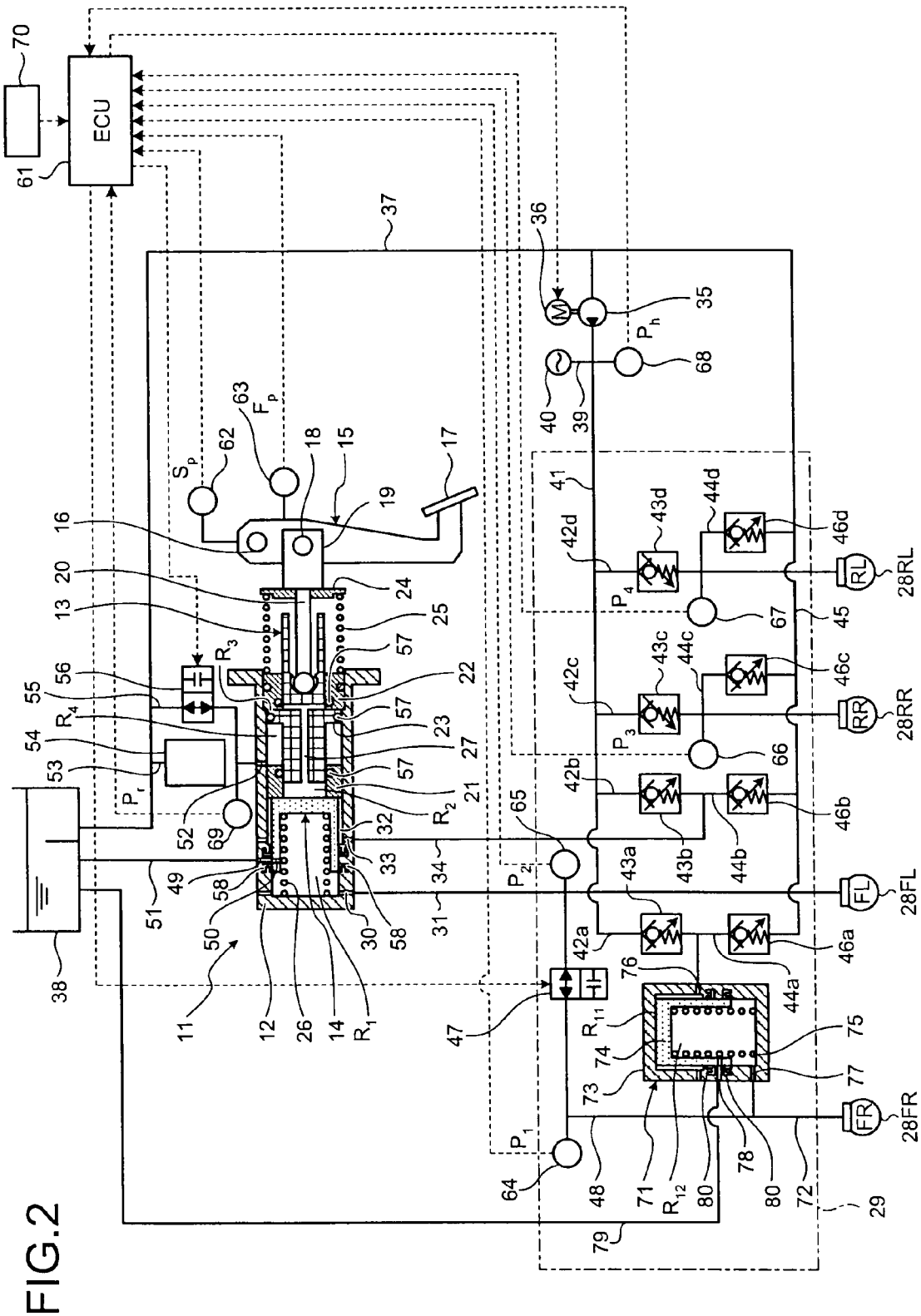
FIG. 2 is a schematic configuration diagram showing a brake system for a vehicle according to a second embodiment of the invention.

FIG. 2 is a schematic configuration diagram showing a brake system for a vehicle according to a second embodiment of the invention. The same reference numerals are designated to members having functions similar to those of the foregoing embodiment and repetitive description will not be given.

In the brake system for a vehicle of the second embodiment, as shown in FIG. 2, the master cylinder 11 is constructed so that the input piston 13 and the pressure piston 14 as drive pistons are supported movably in the axial direction in the cylinder 12. The brake pedal 15 is coupled to the input piston 13 via the operation rod 20. The flange 23 comes into contact with the support members 21 and 22, thereby regulating the stroke of the input piston 13. The input piston 13 is energized and supported in a position where the flange 23 comes into contact with the support member 22 by the reaction force spring 25. The front and rear end faces of the pressure piston 14 come into contact with the cylinder 12 and the support member 21, thereby regulating the stroke of the pressure piston 14 and energizing and supporting the pressure piston 14 in a position where the pressure piston 14 comes into contact with the support member 21 by the energization spring 26. The input piston 13 and the pressure piston 14 are held in a state where they are apart from each other with the predetermined interval (stroke) $S_0$.

In the cylinder 12, the front pressure chamber $R_1$ is defined in the forward direction (left in FIG. 2) of the pressure piston 14, the rear pressure chamber $R_2$ is defined in the backward direction (right in FIG. 2) in the pressure piston 14, that is, between the input piston 13 and the pressure piston 14, and the circulating pressure chamber $R_3$ is defined in the backward direction (right in FIG. 2) in the input piston 13, that is, between the input piston 13 and the support member 22. The reaction force chamber $R_4$ is formed between the support member 21 and the flange 23 of the input piston 13. The rear pressure chamber $R_2$ and the circulating pressure chamber $R_3$ are communicated with each other via the communication path 27 formed in the input piston 13.

On the other hand, the front wheels FR and FL and rear wheels RR and RL are provided with the wheel cylinders 28FR, 28FL, 28RR, and 28RL, and can be operated by the ABS 29. In the ABS 29, to the first pressure port 30 communicated with the front pressure chamber $R_1$ of the master cylinder 11, one end of the first hydraulic pipe 31 is coupled. The other end of the first hydraulic pipe 31 is coupled to the wheel cylinder 28FL of the front wheel FL. One end of the second hydraulic pipe 34 is coupled to the second pressure port 33 communicated with the rear pressure chamber $R_2$ of the master cylinder 11 via the annular coupling path 32.

The four hydraulic supply pipes 42a, 42b, 42c, and 42d are coupled to the accumulator 40 capable of accumulating the hydraulic pressure boosted by the hydraulic pump 35 via the high-pressure supply pipe 41. The distal end of the first hydraulic supply pipe 42a is coupled to a power separating mechanism 71. The power separating mechanism 71 is coupled to the wheel cylinder 28FR of the front wheel FR via a first hydraulic transmission pipe 72. The distal end of the third hydraulic supply pipe 42c is coupled to the wheel cylinder 28RR of the rear wheel RR, and the fourth hydraulic supply pipe 42d is coupled to the wheel cylinder 28RL of the rear wheel RL. The electromagnetic pressure booster valves 43a, 43b, 43c, and 43d of the normal open type are disposed in the hydraulic supply pipes 42a, 42b, 42c, and 42d, respectively.

The hydraulic exhaust pipes 44a, 44b, 44c, and 44d are coupled on the downstream side of the pressure booster valves 43a, 43b, 43c, and 43d in the hydraulic supply pipes 42a, 42b, 42c, and 42d, and the hydraulic exhaust pipes 44a, 44b, 44c, and 44d are collected and coupled to the pipe 37 via the third hydraulic pipe 45. The electromagnetic pressure reducing valves 46a, 46b, 46c, and 46d of a normal close type are disposed in the hydraulic exhaust pipes 44a, 44b, 44c, and 44d, respectively. The other end of the second hydraulic pipe 34 is coupled to a coupling part between the hydraulic supply pipe 42b and the hydraulic exhaust pipe 44b, that is, the pipe between the second pressure booster valve 43b and the second pressure reducing valve 46b.

The power separating mechanism 71 separates the power of the hydraulic system on the master cylinder 11 side and that of the hydraulic system on the accumulator 40 side, thereby preventing an operation error caused by intrusion of air into the hydraulic system on the master cylinder 11 side at the time of occurrence of a failure in the power supply unit. Specifically, a power separation piston 74 is movably supported in a cylinder 73 having a hollow shape and is energized to one side and supported by an energization spring 75, thereby defining two pressure chambers $R_{11}$ and $R_{12}$. The first hydraulic supply pipe 42a is coupled to an input port 76 communicated with the pressure chamber $R_{11}$ and, on the other hand, the first hydraulic transmission pipe 72 is coupled to an output port 77 communicated with the pressure chamber $R_{12}$. In the cylinder 73, an auxiliary port 78 communicated with a side face of the power separation piston 74 is formed and coupled to the reservoir tank 38 via an auxiliary pipe 79. One-way seals 80 are attached on both sides of the auxiliary port 78 to prevent leakage of hydraulic pressure.

The switching valve 47 capable of making the wheel cylinders 28FR and 28FL in the front wheels FR communicated with each other or interrupted from each other is disposed in the coupling pipe 48 for coupling the first hydraulic pipe 31 and the first hydraulic transmission pipe 72. The switching valve 47 is a normal-open-type electromagnetic open/close valve and is closed when power is supplied. In this case, the coupling pipe 48 functions as a coupling line for coupling the wheel cylinders 28FR and 28FL while bypassing the power separating mechanism 71.

Therefore, when the coupling pipe 48 is closed by the switching valve 47, the control pressure adjusted by the first pressure booster valve 43a and the first pressure reducing valve 46a acts via the first hydraulic supply pipe 42a from the input port 76 of the power separating mechanism 71 to the pressure chamber $R_{11}$, and moves the power separation piston 74 against the energization force of the energization spring 75, thereby pressurizing the pressure chamber $R_{12}$. The pressure is output from the output port 77 via the first hydraulic transmission pipe 72 to the wheel cylinder 28FR. On the other hand, when the coupling pipe 48 is opened by the switching valve 47, the control pressure discharged from the front pressure chamber $R_1$ in the master cylinder 11 passes through the first hydraulic pipe 31 and the coupling pipe 48, bypasses the power separating mechanism 71, and is output to the wheel cylinder 28FR via the first hydraulic transmission pipe 72.

In the front pressure chamber $R_1$ in the master cylinder 11, the auxiliary ports 49 and 50 are formed so as to penetrate the cylinder 12 and the pressure piston 14. The auxiliary ports 49 and 50 are coupled to the reservoir tank 38 via the hydraulic pipe 51. The reaction force port 52 communicated with the reaction force chamber $R_4$ is formed in the cylinder 12 in the master cylinder 11. The stroke simulator 54 is disposed in the coupling pipe 53 for coupling the reaction force port 52 and the pipe 37. The bypass pipe 55 for bypassing the stroke simulator 54 is provided between the coupling pipe 53 and the pipe 37, and the normal open type electromagnetic open/close valve 56 is disposed in the bypass pipe 55.

The brake pedal 15 is provided with the stroke sensor 62 for detecting the pedal stroke Sp of the brake pedal 15, and the pedal effort sensor 63 for detecting the pedal effort Fp, and the detection results are output to the ECU 61. The coupling pipe 48 connected to the first hydraulic supply pipe 42a is provided with the first pressure sensor 64 for detecting the control pressure $P_1$ supplied to the wheel cylinder 28FR of the front wheel FR. The first hydraulic pipe 31 is provided with the second pressure sensor 65 for detecting the control pressure $P_2$ supplied from the front pressure chamber $R_1$ of the master cylinder 11 to the wheel cylinder 28FL of the front wheel FL. Further, the third and fourth hydraulic supply pipes 42c and 42d are provided with the third and fourth pressure sensors 66 and 67 for detecting the control pressures $P_3$ and $P_4$ supplied to the wheel cylinders 28RR and 28RL of the rear wheels RR and RL. The pressure sensors 64, 65, 66, and 67 output detection results to the ECU 61.

The high-pressure supply pipe 41 extending from the accumulator 40 to the hydraulic supply pipes 42a, 42b, 42c, and 42d is provided with the pressure sensor 68 for detecting the hydraulic pressure $P_h$ accumulated in the accumulator 40. The pressure sensor 69 for detecting the reaction force hydraulic pressure $P_r$ acting on the reaction force chamber $R_4$ by the stroke simulator 54 is provided between the reaction force port 52 and the stroke simulator 54 in the coupling pipe 53. Each of the pressure sensors 68 and 69 outputs the detection result to the ECU 61. Each of the front wheels FR and FL and the rear wheels RR and RL is provided with the wheel speed sensor 70, and detected wheel speeds are output to the ECU 61.

Therefore, the ECU 61 sets the target control pressure $P_T$ on the basis of the pedal effort Fp of the brake pedal 15 detected by the pedal effort sensor 63 (or the pedal stroke Sp detected by the stroke sensor 62) and controls the pressure booster valves 43a, 43b, 43c, and 43d and the pressure reducing valves 46a, 46b, 46c, and 46d. On the other hand, the ECU 61 feeds back the control pressures $P_1$, $P_2$, $P_3$, and $P_4$ detected by the pressure sensors 64, 65, 66, and 67 and controls so that the target control pressure $P_T$ and the control pressures $P_1$, $P_2$, $P_3$, and $P_4$ match each other. In this case, the ECU 61 individually controls the pressure booster valves 43a, 43b, 43c, and 43d and the pressure reducing valves 46a, 46b, 46c, and 46d in accordance with the travel state of the vehicle, thereby independently pressurizing the wheel cylinders 28FR, 28FL, 28RR, and 28RL and adjusting the braking force of the front wheels FR and FL and the rear wheels RR and RL.

A braking force control in the brake system for a vehicle in the embodiment will be described specifically. When an occupant steps on the brake pedal 15, the input piston 13 moves forward by the operation force, and the pressure piston 14 moves forward with the predetermined stroke $S_0$ maintained. The pedal effort sensor 63 detects the pedal effort Fp, and the ECU 61 sets the target control pressure $P_T$ on the basis of the pedal effort Fp. The ECU 61 controls the pressure booster valves 43a, 43b, 43c, and 43d and the pressure reducing valves 46a, 46b, 46c, and 46d on the basis of the target control pressure $P_T$ to control the braking hydraulic pressure of each of the wheel cylinders 28FR, 28FL, 28RR, and 28RL of the front wheels FR and FL and the rear wheels RR and RL.

In the case where the power supply system operates normally, the coupling pipe 48 is closed by the switching valve 47, and the bypass pipe 55 is closed by the open/close valve 56. The ECU 61 increases or decreases the hydraulic pressure from the accumulator 40 by controlling the first pressure booster valve 43a and the first pressure reducing valve 46a on the basis of the target control pressure $P_T$, outputs the resultant hydraulic pressure to the wheel cylinder 28FR of the front wheel FR via the power separating mechanism 71, and feeds back the control pressure $P_1$ detected by the first pressure sensor 64. The ECU 61 increases or decreases the hydraulic pressure from the accumulator 40 by controlling the second pressure booster valve 43b and the second pressure reducing valve 46b on the basis of the target control pressure $P_T$, and outputs the resultant hydraulic pressure to the rear pressure chamber $R_2$ in the master cylinder 11 via the second hydraulic pressure pipe 34. In the master cylinder 11, the pressure piston 14 is assisted by applying/reducing pressure to/in the rear pressure chamber $R_2$. The front pressure chamber $R_1$ is pressurized, the resultant hydraulic pressure is output to the wheel cylinder 28FL of the front wheel FL via the first hydraulic pipe 31, and the control pressure $P_2$ detected by the second pressure sensor 65 is fed back.

Further, the ECU 61 increases or decreases the hydraulic pressure from the accumulator 40 by controlling the third and fourth pressure booster valves 43c and 43d and the third pressure reducing valves 46c and 46d on the basis of the target control pressure $P_T$, outputs the resultant hydraulic pressure to the wheel cylinders 28RR and 28RL of the rear wheels RR and RL, and feeds back the control pressures $P_3$ and $P_4$ detected by the third and fourth pressure sensors 66 and 67.

Therefore, the hydraulic pressure from the accumulator 40 is output as the braking hydraulic pressure via the pressure booster valves 43a, 43c, and 43d and the pressure reducing valves 46a, 46c, and 46d to the wheel cylinders 28FR, 28RR, and 28RL, and the hydraulic pressure from the accumulator 40 is output to the rear pressure chamber $R_2$ in the master cylinder 11 via the pressure booster valve 43b and the pressure reducing valve 46b to assist the pressure piston 14, thereby pressurizing the front pressure chamber $R_1$. The resultant hydraulic pressure is output from the front pressure chamber $R_1$ as a braking hydraulic pressure to the wheel cylinder 28FL via the first hydraulic pipe 31. Consequently, in the ABS 29, the braking hydraulic pressures of the wheel cylinders 28FR, 28FL, 28RR, and 28RL of the front wheels FR and FL and the rear wheels RR and RL are individually adjusted and applied. Thus, the braking force according to the operation force on the brake pedal 15 of the occupant can be generated for the front wheels FR and FL and the rear wheels RR and RL.

In the case where a failure occurs in the power supply system, the coupling pipe 48 is opened by the switching valve 47 and the bypass pipe 55 is opened by the open/close valve 56. Consequently, when the occupant steps on the brake pedal 15, the input piston 13 moves forward by the operation force by the predetermined stroke $S_0$. The input piston 13 comes into contact with the pressure piston 14, and the pistons 13 and 14 move forward integrally. The front pressure chamber $R_1$ is pressurized, so that the hydraulic pressure in the front pressure chamber $R_1$ is discharged to the first hydraulic pipe 31. The hydraulic pressure discharged to the first hydraulic pipe 31 is applied as the braking hydraulic pressure to the wheel cylinder 28FL of the front wheel FL via the first hydraulic pipe 31, and applied as the baking hydraulic pressure to the wheel cylinder 28FR of the front wheel FR via the coupling pipe 48. Therefore, the braking force according to the operation force on the brake pedal 15 of the occupant can be generated to the front wheels FR and FL.

Since the power separating mechanism 71 is interposed between the first hydraulic supply pipe 42a coupled to the hydraulic pump 35 and the high-pressure supply pipe 41 of the accumulator 40 and the first hydraulic transmission pipe 72 of the wheel cylinder 28FR, the control pressure generated in the front pressure chamber $R_1$ in the master cylinder 11 passes from the first hydraulic pipe 31 through the coupling pipe 48 and the first hydraulic transmission pipe 72 and is applied to the wheel cylinder 28FR of the front wheel FR and is also applied from the first hydraulic pipe 31 directly to the wheel cylinder 28FL of the front wheel FL separate from the high-pressure supply pipe 41 side. Consequently, for example, even when air enters the high pressure system having the accumulator 40 at the time of a failure in the power supply system, the air does not enter the hydraulic pressure supply system of the master cylinder 11. The control pressure generated in the front pressure chamber $R_1$ can be properly supplied to the wheel cylinders 28FR and 28FL, and the braking force according to the operation force on the brake pedal 15 of the occupant can be generated to the front wheels FR and FL.

As described above, in the brake system for a vehicle of the second embodiment, the high-pressure supply pipe 41 of the accumulator 40 is coupled to the wheel cylinders 28FR, 28RR, and 28RL via the hydraulic supply pipes 42a, 42c, and 42d, respectively, and coupled to the rear pressure chamber $R_2$ via the hydraulic supply pipe 42b and the second hydraulic pipe 34. The pressure booster valves 43a, 43b, 43c, and 43d and the pressure reducing valves 46a, 46b, 46c, and 46d are attached to the hydraulic supply pipes 42a, 42b, 42c, and 42d, respectively. The wheel cylinder 28FL is coupled to the front pressure chamber $R_1$ via the first hydraulic pipe 31, the power separating mechanism 71 is coupled to the hydraulic supply pipe 42a, the wheel cylinder 28FR is coupled via the first hydraulic transmission pipe 72, and the coupling pipe 48 bypassing the power separating mechanism 71 is provided with the switching valve 47.

Therefore, when the power supply system is normal, the ECU 61 sets the target control pressure $P_T$ according to the pedal effort Fp and controls the pressure booster valves 43a, 43c, and 43d and the pressure reducing valves 46a, 46c, and 46d on the basis of the target control pressure $P_T$, thereby adjusting the hydraulic pressure from the accumulator 40, and outputs the hydraulic pressure to the wheel cylinder 28FR of the front wheel FR and the wheel cylinders 28RR and 28RL of the rear wheels RR and RL. By controlling the second pressure booster valve 43b and the second pressure reducing valve 46b, the hydraulic pressure from the accumulator 40 is adjusted. The adjusted hydraulic pressure is output to the rear pressure chamber $R_2$ via the second hydraulic pipe 34 to assist the pressure piston 14. The hydraulic pressure pressurizing the front pressure chamber $R_1$ is output to the wheel cylinder 28FL of the front wheel FL via the first hydraulic pipe 31, and a proper control pressure is made to act on each of the wheel cylinders 28FR, 28FL, 28RR, and 28RL. As a result, proper braking force according to the operation force of the brake pedal 15 of the occupant can be generated for the front wheels FR and FL and the rear wheels RR and RL.

On the other hand, when a failure occurs in the power supply system, the coupling pipe 48 for coupling the first hydraulic pipe 31 and the hydraulic supply pipe 42a is opened by the switching valve 47. According to an operation on the brake pedal 15, the input piston 13 and the pressure piston 14 move integrally, and the front pressure chamber $R_1$ is pressurized, and the hydraulic pressure in the front pressure chamber $R_1$ is output to the wheel cylinder 28FL of the front wheel FL via the first hydraulic pipe 31, and the hydraulic pressure in the front pressure chamber $R_1$ is output to the wheel cylinder 28FR of the front wheel FR via the first hydraulic pipe 31, the coupling pipe 48, and the first hydraulic transmission pipe 72. The braking hydraulic pressure acts on the wheel cylinders 28FR, 28FL, 28RR, and 28RL, and proper braking force according to the operation force on the brake pedal 15 of the occupant can be generated to the front wheels FR and FL and the rear wheels RR and RL.

Since the first hydraulic supply pipe 42a coupled to the hydraulic pipe 35 and the high-pressure supply pipe 41 of the accumulator 40 and the first hydraulic transmission pipe 72 of the wheel cylinder 28FR are separated from each other by the power separating mechanism 71, even when air enters the high pressure system having the accumulator 40 due to a failure in the power supply system, the air does not enter the hydraulic pressure supply system of the master cylinder 11 by the power separating mechanism 71. The control pressure generated in the front pressure chamber $R_1$ can be properly supplied to the wheel cylinders 28FR and 28FL, and the braking force according to the operation force on the brake pedal 15 of the occupant can be generated to the front wheels FR and FL.

In the embodiment, when the power supply system is normal, by controlling the pressure booster valves 43a, 43c, and 43d and the pressure reducing valves 46a, 46c, and 46d on the basis of the target control pressure $P_T$, the hydraulic pressure according to the operation on the brake pedal 15 of the occupant can be generated reliably. On the other hand, when the power supply system fails, the static pressure of the master cylinder 11 is allowed to act directly on the wheel cylinders 28FR and 28FL, thereby enabling the hydraulic pressure according to the operation on the brake pedal 15 of the occupant to be reliably generated. As a result, the hydraulic path is simplified, the structure can be simplified, and the manufacture cost can be reduced. On the other hand, proper braking force control can be performed, and reliability and safety can be improved.

Third Embodiment

Figure 3:
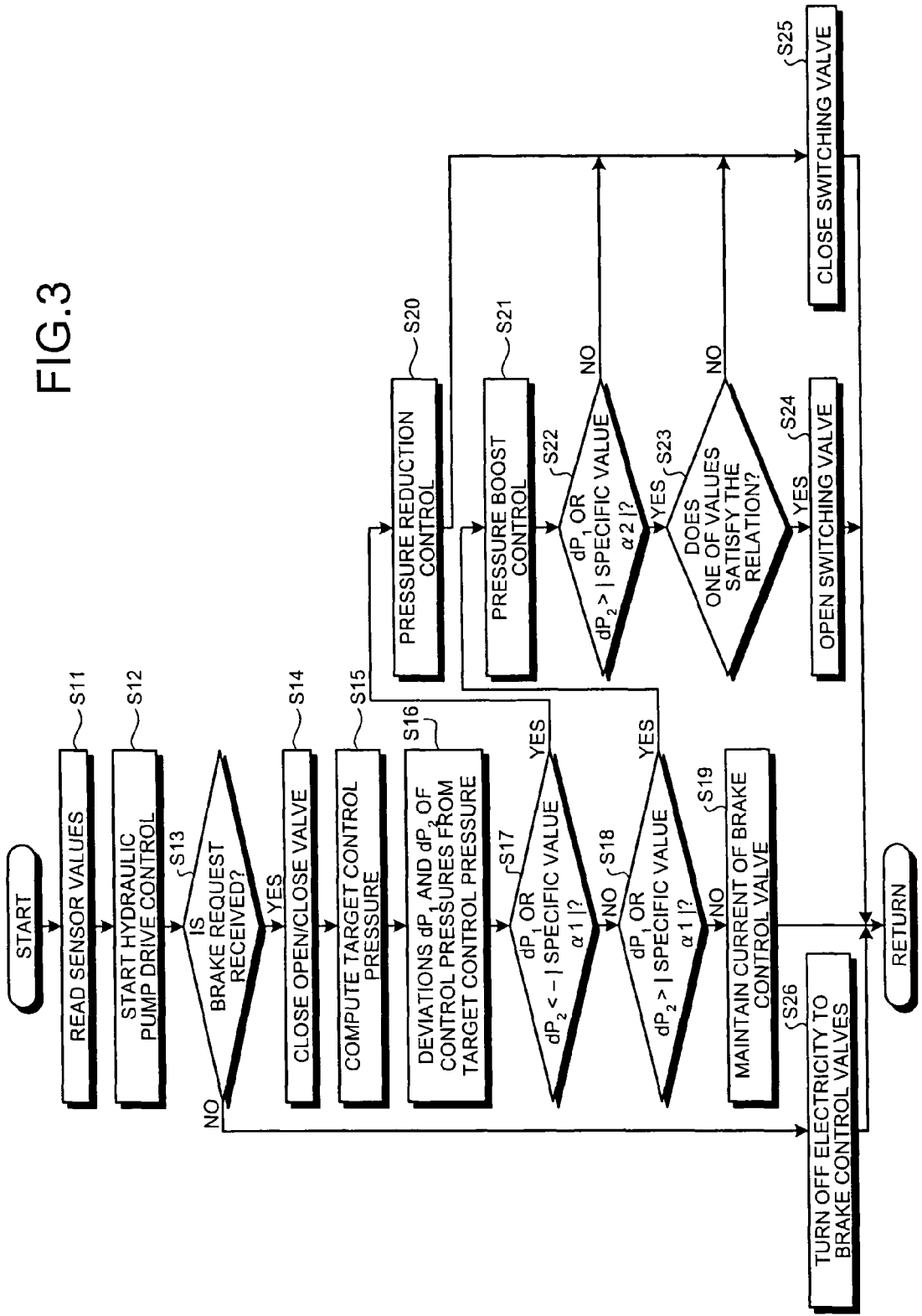
FIG. 3 is a flowchart showing braking force control in a brake system for a vehicle according to a third embodiment of the invention.

FIG. 3 is a flowchart showing the braking force control in the brake system for a vehicle according to a third embodiment of the invention. A general configuration of the brake system for a vehicle of the third embodiment is similar to that of the foregoing first embodiment and will be described with reference to FIG. 1. The same reference numerals are designated to members having functions similar to those of the foregoing embodiment and repetitive description will not be given.

In the brake system for a vehicle of the third embodiment, as shown in FIG. 1, the master cylinder 11 is constructed so that the input piston 13 and the pressure piston 14 are supported movably in the cylinder 12. The operation rod 20 of the brake pedal 15 is coupled to the input piston 13. By disposing the input piston 13 and the pressure piston 14 in the cylinder 12, the front pressure chamber $R_1$, the rear pressure chamber $R_2$, the circulating pressure chamber $R_3$, and the reaction force chamber $R_4$ are defined. The rear pressure chamber $R_2$ and the circulating pressure chamber $R_3$ are communicated with each other via the communication path 27. Therefore, when the driver steps on the brake pedal 15, the input piston 13 moves forward against the energization force of the reaction force spring 25 via the operation rod 20. The input piston 13 comes into contact with the pressure piston 14, and the input piston 13 and the pressure piston 14 can integrally move forward.

On the other hand, the front wheels FR and FL and rear wheels RR and RL are provided with the wheel cylinders 28FR, 28FL, 28RR, and 28RL, and can be operated by the ABS 29. The first pressure port 30 communicated with the front pressure chamber $R_1$ of the master cylinder 11 is coupled to the wheel cylinder 28FL of the front wheel FL via the first hydraulic pipe 31. The second hydraulic pipe 34 is coupled to the second pressure port 33 communicated with the rear pressure chamber $R_2$. The four hydraulic supply pipes 42a, 42b, 42c, and 42d are coupled to the accumulator 40 via the high-pressure supply pipe 41. The first hydraulic supply pipe 42a is coupled to the wheel cylinder 28FR, the third hydraulic supply pipe 42c is coupled to the wheel cylinder 28RR, and the fourth hydraulic supply pipe 42d is coupled to the wheel cylinder 28RL. The pressure booster valves 43a, 43b, 43c, and 43d are disposed in the hydraulic supply pipes 42a, 42b, 42c, and 42d, respectively.

The hydraulic supply pipes 42a, 42b, 42c, and 42d are coupled to the hydraulic exhaust pipes 44a, 44b, 44c, and 44d and coupled to the pipe 37 via the third hydraulic pipe 45. The pressure reducing valves 46a, 46b, 46c, and 46d are disposed in the hydraulic exhaust pipes 44a, 44b, 44c, and 44d, respectively. The second hydraulic pipe 34 is coupled to a coupling part between the hydraulic supply pipe 42b and the hydraulic exhaust pipe 44b. Further, the switching valve 47 is disposed in the coupling pipe 48 for coupling the first hydraulic pipe 31 and the first hydraulic supply pipe 42a. The switching valve 47 is an electromagnetic open/close valve of the normal open type and is closed when power is supplied.

The brake pedal 15 is provided with the stroke sensor 62 for detecting the pedal stroke Sp and the pedal effort sensor 63 for detecting the pedal effort Fp, and the detection results are output to the ECU 61. The first hydraulic supply pipe 42a is provided with the first pressure sensor 64 for detecting the control pressure $P_1$ supplied to the wheel cylinder 28FR of the front wheel FR. The first hydraulic pipe 31 is provided with the second pressure sensor 65 for detecting the control pressure $P_2$ supplied from the front pressure chamber $R_1$ of the master cylinder 11 to the wheel cylinder 28FL of the front wheel FL. The third and fourth hydraulic supply pipes 42c and 42d are provided with the third and fourth pressure sensors 66 and 67 for detecting the control pressures $P_3$ and $P_4$ supplied to the wheel cylinders 28RR and 28RL of the rear wheels RR and RL. The pressure sensors 64, 65, 66, and 67 output detection results to the ECU 61.

The high-pressure supply pipe 41 extending from the accumulator 40 to the hydraulic supply pipes 42a, 42b, 42c, and 42d is provided with the pressure sensor 68 for detecting the hydraulic pressure $P_h$ accumulated in the accumulator 40. The pressure sensor 69 for detecting the reaction force hydraulic pressure $P_r$ acting on the reaction force chamber $R_4$ by the stroke simulator 54 is provided between the reaction force port 52 and the stroke simulator 54 in the coupling pipe 53. Each of the pressure sensors 68 and 69 outputs the detection result to the ECU 61. Each of the front wheels FR and FL and the rear wheels RR and RL is provided with the wheel speed sensor 70, and detected wheel speeds are output to the ECU 61.

Therefore, the ECU 61 sets the target control pressure $P_T$ on the basis of the pedal effort Fp of the brake pedal 15 detected by the pedal effort sensor 63 (or the pedal stroke Sp detected by the stroke sensor 62) and controls the pressure booster valves 43a, 43b, 43c, and 43d and the pressure reducing valves 46a, 46b, 46c, and 46d. On the other hand, the ECU 61 feeds back the control pressures $P_1, P_2, P_3$, and $P_4$ detected by the pressure sensors 64, 65, 66, and 67 and controls so that the target control pressure $P_T$ and the control pressures $P_1, P_2, P_3$, and $P_4$ match each other. In this case, the ECU 61 individually controls the pressure booster valves 43a, 43b, 43c, and 43d and the pressure reducing valves 46a, 46b, 46c, and 46d in accordance with the travel state of the vehicle, thereby independently pressurizing the wheel cylinders 28FR, 28FL, 28RR, and 28RL and adjusting the braking force of the front wheels FR and FL and the rear wheels RR and RL.

In the brake system for a vehicle, when the pressure piston 14 moves forward in the master cylinder 11 and a bottoming state in which the distal end of the pressure piston 14 comes into contact with the cylinder 12 is obtained, the front pressure chamber $R_1$ cannot be pressurized, and a braking hydraulic pressure according to the target control pressure $P_T$ cannot be applied to the wheel cylinder 28FL of the front wheel FL. In the case where the hydraulic pressure supply system for supplying hydraulic pressure to the wheel cylinders 28FR and 28FL of the front wheels FR and FL, for example, the first hydraulic supply pipe 42a, or the first hydraulic pipe 31 is damaged and fails, the braking hydraulic pressure according to the target control pressure $P_T$ cannot be applied to the wheel cylinder 28FL of the front wheel FL.

In the brake system for a vehicle of the embodiment, when the bottoming state of the master cylinder 11 is obtained or when a failure occurs in the hydraulic pressure supply system, the ECU 61 opens/closes the switching valve 47, thereby enabling the proper braking force to be assured in the wheel cylinders 28FR and 28FL of the front wheels FR and FL.

The braking force control performed at the time of bottoming of the master cylinder 11 or occurrence of a failure in the hydraulic pressure supply system in the brake system for a vehicle in the embodiment will be described by using the flowchart of FIG. 3. In the braking force control of the brake system for a vehicle of the embodiment, as shown in FIG. 3, in step S11, the ECU 61 reads detection values of the stroke sensor 62, the pedal effort sensor 63, and the pressure sensors 64, 65, 66, 67, 68, and 69. In step S12, the ECU 61 starts a drive control on the hydraulic pump 35. Specifically, the ECU 61 drives the motor 36 and operates the hydraulic pump 35 so that the hydraulic pressure $P_h$ accumulated in the accumulator 40 detected by the pressure sensor 68 becomes equal to or higher than a preset pressure.

In step S13, the ECU 61 determines whether a brake request is received from the driver or not. That is, the ECU 61 determines whether or not the stroke sensor 62 detects the pedal stroke Sp of the brake pedal 15 or the pedal effort sensor 63 detects the pedal effort Fp of the brake pedal 15. When it is determined that there is no brake request from the driver, the ECU 61 in step S26 turns off electricity to the brake control valves, that is, the pressure booster valves 43a and 43b and the pressure reducing valves 46a and 46b constructing the ABS 29.

On the other hand, when it is determined in step S13 that a brake request is received from the driver, in step S14, current is passed to the open/close valve 56, which is then closed, for operating the stroke simulator 54. In step S15, the ECU 61 computes and sets the target control pressure $P_T$ on the basis of the pedal effort Fp. In step S16, the ECU 61 calculates deviations $dp_1$ and $dp_2$ of the actual control pressures (hydraulic pressures) $P_1$ and $P_2$ detected by the first and second pressure sensors 64 and 65 from the target control pressure $P_T$.

In step S17, the ECU 61 determines whether or not the deviations $dp_1$ and $dp_2$ are smaller than the negative value of the absolute value of a preset specific value $\alpha 1$ or not, that is, whether or not the actual control pressures (hydraulic pressures) $P_1$ and $P_2$ exceed the target control pressure $P_T$ by an amount larger than the specific value $\alpha 1$. When it is determined that the deviations $dp_1$ and $dp_2$ are not smaller than the negative value of the absolute value of the specific value $\alpha 1$, in step S18, the ECU 61 determines whether or not the deviations $dp_1$ and $dp_2$ are larger than the absolute value of the preset specific value $\alpha 1$, that is, whether or not the actual control pressures (hydraulic pressures) $P_1$ and $P_2$ are below the target control pressure $P_T$ by an amount larger than the specific value $\alpha 1$. When the ECU 61 determines that the deviations $dp_1$ and $dp_2$ are not larger than the absolute value of the specific value $\alpha 1$, in step S19, the current passing state of the brake control valves, that is, the pressure booster valves 43a and 43b and the pressure reducing valves 46a and 46b is held.

On the other hand, when it is determined in step S17 that the deviations $dp_1$ and $dp_2$ are smaller than the negative value of the absolute value of the specific value $\alpha 1$, the pressure reduction control is performed by using the pressure booster valves 43a and 43b and the pressure reducing valves 46a and 46b in step S20, thereby reducing the hydraulic pressure supplied to the wheel cylinders 28FR and 28FL of the front wheels FR and FL. In step S25, the switching valve 47 is closed. Specifically, when the hydraulic pressures $P_1$ and $P_2$ supplied to the wheel cylinders 28FR and 28FL are higher than the target control pressure $P_T$, the hydraulic supply system can supply sufficient hydraulic pressure to the wheel cylinders 28FR and 28FL, and it can be determined that there is no bottoming in the master cylinder 11 or no failure in the hydraulic pressure supply system. Therefore, by closing the switching valve 47, the hydraulic pressure supply system of the wheel cylinders 28FR and 28FL is separated and independently controlled.

When it is determined in step S18 that the deviations $dp_1$ and $dp_2$ are larger than the absolute value of the specific value $\alpha 1$, by performing pressure boost control using the pressure booster valves 43a and 43b and the pressure reducing valves 46a and 46b in step S21, the hydraulic pressure supplied to the wheel cylinders 28FR and 28FL of the front wheels FR and FL is increased. In step S22, whether or not the deviations $dp_1$ and $dp_2$ are larger than the absolute value of a preset specific value $\alpha 2$ is determined. In this case, the specific values $\alpha 1$ and $\alpha 2$ have the relation of $\alpha 1 < \alpha 2$. Here, it is determined whether or not the deviations $dp_1$ and $dp_2$ increase regardless of the pressure boost control executed on the wheel cylinders 28FR and 28FL in step S21.

When it is determined in step S22 that deviations $dp_1$ and $dp_2$ are smaller than the absolute value of the specific value $\alpha 2$, the switching valve 47 is closed in step S25. That is, it can be determined that the deviations $dp_1$ and $dp_2$ decrease because of the pressure boost control executed on the wheel cylinders 28FR and 28FL in the step S21. Consequently, by closing the switching valve 47, the hydraulic pressure supply system of the wheel cylinders 28FR and 28FL is interrupted and independently controlled.

On the other hand, when it is determined in step S22 that deviations $dp_1$ and $dp_2$ are larger than the absolute value of the specific value $\alpha 2$, it is determined that the deviations $dp_1$ and $dp_2$ are increasing in spite of execution of the pressure boost control on the wheel cylinders 28FR and 28FL in step S21, and the ECU 61 shifts to step S23. In the step S23, whether only one of the deviations $dp_1$ and $dp_2$ is larger than the absolute value of the specific value $\alpha 2$ or not is determined. When it is determined that only the deviation $dp_1$ is larger than the absolute value of the specific value $\alpha 2$ or only the deviation $dp_2$ is larger than the absolute value of the specific value $\alpha 2$, the switching valve 47 is opened in step S24.

In the case where it is determined that only one of the deviations $dp_1$ and $dp_2$ is larger than the absolute value of the specific value $\alpha 2$, the cause may be that the hydraulic pressure $P_2$ of the wheel cylinder 28FL cannot be boosted to the target control pressure $P_T$ due to bottoming of the master cylinder 11. Therefore, in this case, by opening the switching valve 47, the hydraulic pressure supply systems of the wheel cylinders 28FR and 28FL are connected and a cooperative control is performed. Specifically, the hydraulic pressure from the accumulator 40 is output via the first hydraulic pressure supply pipe 42a to the wheel cylinder 28FR, supplied from the first hydraulic pressure supply pipe 42a via the coupling pipe 48 to the first hydraulic pipe 31, and output from the first hydraulic pressure supply pipe 42a to the wheel cylinder 28FL, thereby suppressing a drop in the hydraulic pressure $P_2$ of the wheel cylinder 28FL caused by bottoming of the master cylinder 11. In the case where it is determined that only one of the deviations $dp_1$ and $dp_2$ is larger than the absolute value of the specific value $\alpha 2$, the cause may be that one of the hydraulic pressure supply systems of the wheel cylinders 28FR and 28FL fails. Therefore, in this case as well, by opening the switching valve 47, the hydraulic pressure supply systems of the wheel cylinders 28FR and 28FL are connected and a cooperative control is performed.

On the other hand, when it is determined in step S23 that both of the deviations $dp_1$ and $dp_2$ are larger than the absolute value of the specific value $\alpha 2$, the switching valve 47 is closed in step S25. When it is determined that both of the deviations $dp_1$ and $dp_2$ are larger than the absolute value of the specific value $\alpha 2$, the cause may be that both of the hydraulic pressure supply systems of the wheel cylinders 28FR and 28FL fail. Therefore, in this case, by closing the switching valve 47, a further drop in the hydraulic pressures $P_1$ and $P_2$ is prevented, and the hydraulic pressure supply systems of the wheel cylinders 28FR and 28FL are interrupted and independently controlled.

As described above, in the brake system for a vehicle of the third embodiment, the high-pressure supply pipe 41 of the accumulator 40 is coupled to the wheel cylinders 28FR, 28RR, and 28RL via the hydraulic supply pipes 42a, 42c, and 42d and coupled to the rear pressure chamber $R_2$ via the hydraulic supply pipe 42b and the second hydraulic pipe 34. The pressure booster valves 43a, 43b, 43c, and 43d and the pressure reducing valves 46a, 46b, 46c, and 46d are attached to the hydraulic supply pipes 42a, 42b, 42c, and 42d, respectively. The wheel cylinder 28FR is coupled to the front pressure chamber $R_1$ via the first hydraulic pipe 31, the coupling pipe 48 for coupling the first hydraulic pipe 31 and the hydraulic pressure supply pipe 42a is provided with the switching valve 47, and the switching valve 47 is opened/closed on the basis of the control pressures (hydraulic pressures) $P_1$ and $P_2$ to the wheel cylinders 28FR and 28RR.

Therefore, after the pressure boost control is executed on the wheel cylinders 28FR and 28FL, when it is determined that only one of the deviations $dp_1$ and $dp_2$ of the actual control pressures (hydraulic pressures) $P_1$ and $P_2$ from the target control pressure $P_T$ is larger than the absolute value of the specific value $\alpha 2$, by opening the switching valve 47, the hydraulic pressure supply systems of the wheel cylinders 28FR and 28FL are connected and a cooperative control is performed. A drop in the hydraulic pressure $P_2$ of the wheel cylinder 28FL caused by bottoming of the master cylinder 11 can be suppressed, a proper braking force can be applied to the front and rear wheels FR and FL, and the travel stability of the vehicle can be improved.

In the case where it is determined that both of the deviations $dp_1$ and $dp_2$ are larger than the absolute value of the specific value $\alpha 2$, by closing the switching valve 47, the hydraulic pressure supply systems of the wheel cylinders 28FR and 28FL are interrupted and independently controlled. Therefore, a further drop in the hydraulic pressures $P_1$ and $P_2$ in the wheel cylinders 28FR and 28FL is prevented, and deterioration in the travel stability of the vehicle can be suppressed.

As described above, in the embodiment, by opening/closing the switching valve 47 on the basis of the control pressures (hydraulic pressures) $P_t$ and $P_2$ to the wheel cylinders 28FR and 28RR, the hydraulic pressure according to the operation on the brake pedal 15 of the occupant can be generated reliably. As a result, the hydraulic path is simplified, the structure can be simplified, and the manufacture cost can be reduced. On the other hand, proper braking force control can be performed, and reliability and safety can be improved.

Fourth Embodiment

Figure 4:
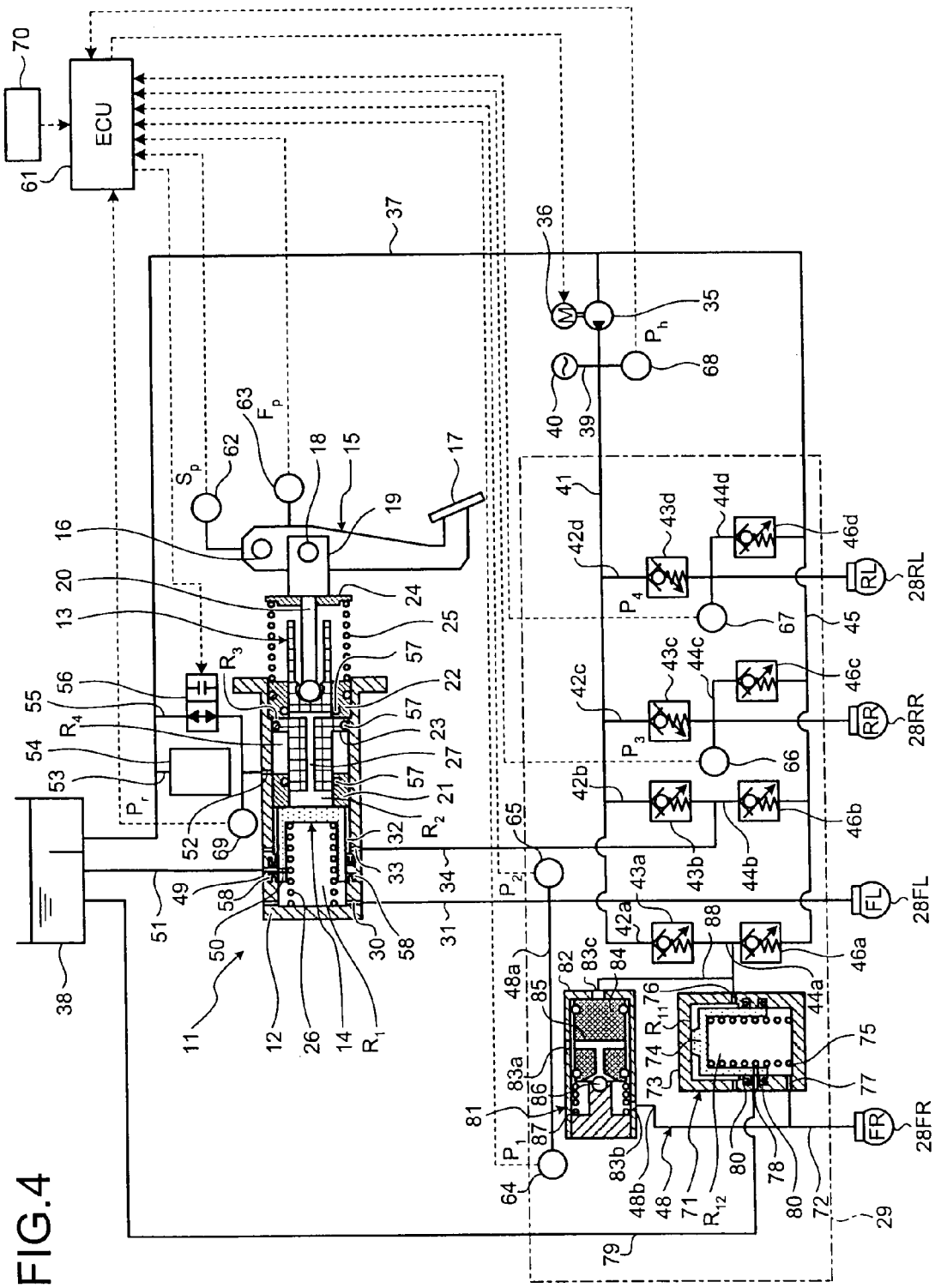
FIG. 4 is a schematic configuration diagram showing a brake system for a vehicle according to a fourth embodiment of the invention.

FIG. 4 is a schematic configuration diagram showing a brake system for a vehicle according to a fourth embodiment of the invention. The same reference numerals are designated to members having functions similar to those of the foregoing embodiments and repetitive description will not be given.

In the brake system for a vehicle of the fourth embodiment, as shown in FIG. 4, the master cylinder 11 is constructed so that the input piston 13 and the pressure piston 14 are supported movably in the cylinder 12. The operation rod 20 of the brake pedal 15 is coupled to the input piston 13. By disposing the input piston 13 and the pressure piston 14 in the cylinder 12, the front pressure chamber $R_1$, the rear pressure chamber $R_2$, the circulating pressure chamber $R_3$/and the reaction force chamber $R_4$ are defined, and the rear pressure chamber $R_2$ and the circulating pressure chamber $R_3$ are communicated with each other via the communication path 27. Therefore, when the driver steps on the brake pedal 15, the input piston 13 moves forward against the energization force of the reaction force spring 25 via the operation rod 20 and comes into contact with the pressure piston 14, and the input piston 13 and the pressure piston 14 can move forward integrally.

On the other hand, the front wheels FR and FL and rear wheels RR and RL are provided with the wheel cylinders 28FR, 28FL, 28RR, and 28RL, and can be operated by the ABS 29. In the ABS 29, to the first pressure port 30 communicated with the front pressure chamber $R_1$ of the master cylinder 11, one end of the first hydraulic pipe 31 is coupled. The other end of the first hydraulic pipe 31 is coupled to the wheel cylinder 28FL of the front wheel FL. One end of the second hydraulic pipe 34 is coupled to the second pressure port 33 communicated with the rear pressure chamber $R_2$ of the master cylinder 11 via the annular coupling path 32.

The four hydraulic supply pipes 42a, 42b, 42c, and 42d are coupled to the accumulator 40 capable of accumulating the hydraulic pressure boosted by the hydraulic pump 35 via the high-pressure supply pipe 41. The distal end of the first hydraulic supply pipe 42a is coupled to the power separating mechanism 71. The power separating mechanism 71 is coupled to the wheel cylinder 28FR of the front wheel FR via the first hydraulic transmission pipe 72. The distal end of the third hydraulic supply pipe 42c is coupled to the wheel cylinder 28RR of the rear wheel RR, and the fourth hydraulic supply pipe 42d is coupled to the wheel cylinder 28RL of the rear wheel RL. The electromagnetic pressure booster valves 43a, 43b, 43c, and 43d of the normal open type are disposed in the hydraulic supply pipes 42a, 42b, 42c, and 42d, respectively.

The hydraulic exhaust pipes 44a, 44b, 44c, and 44d are coupled on the downstream side of the pressure booster valves 43a, 43b, 43c, and 43d in the hydraulic supply pipes 42a, 42b, 42c, and 42d, and the hydraulic exhaust pipes 44a, 44b, 44c, and 44d are collected and coupled to the pipe 37 via the third hydraulic pipe 45. The electromagnetic pressure reducing valves 46a, 46b, 46c, and 46d of a normal close type are disposed in the hydraulic exhaust pipes 44a, 44b, 44c, and 44d, respectively. The other end of the second hydraulic pipe 34 is coupled to a coupling part between the hydraulic supply pipe 42b and the hydraulic exhaust pipe 44b, that is, the pipe between the second pressure booster valve 43b and the second pressure reducing valve 46b.

In the power separating mechanism 71, the power separation piston 74 is movably supported in the cylinder 73 and is energized to one side and supported by the energization spring 75, thereby defining two pressure chambers $R_{11}$ and $R_{12}$. The first hydraulic supply pipe 42a is coupled to the input port 76 communicated with the pressure chamber $R_{11}$ and, on the other hand, the first hydraulic transmission pipe 72 is coupled to the output port 77 communicated with the pressure chamber $R_{12}$. In the cylinder 73, the auxiliary port 78 communicated with a side face of the power separation piston 74 is formed and coupled to the reservoir tank 38 via the auxiliary pipe 79. The one-way seals 80 are attached on both sides of the auxiliary port 78 to prevent leakage of hydraulic pressure.

A switching valve 81 capable of making the wheel cylinders 28FR and 28FL in the front wheels FR communicated with each other or interrupted from each other is disposed in the coupling pipe 48 for coupling the first hydraulic pipe 31 and the first hydraulic transmission pipe 72. The switching valve 81 enables communication and interruption between the wheel cylinders 28RR and 28RL in accordance with the hydraulic pressure adjusted by the first pressure booster valve 43a as the first pressure control valve.

Specifically, in the switching valve 81, a coupling port 83a, an exhaust port 83b, and an operation port 83c are formed in a hollow-shaped housing 82. The operation port 83c is coupled to the hydraulic exhaust pipe 44a. A movable element 84 is movably supported in the housing 82. In the movable element 84, a communication hole 85 capable of making the coupling port 83a and the exhaust port 83b communicated with each other is formed, and a ball valve 86 is attached so as to face one end of the communication hole 85. The movable element 84 is energized in a direction that one end of the communication hole 85 is apart from the ball valve 86 by the energization force of an energization spring 87 interposed between the movable element 84 and the housing 82. When the movable element 84 moves against the energization force of the energization spring 87, one end of the communication hole 85 is closely attached to the ball valve 86, so that the communication hole 85 can be closed.

The coupling pipe 48 is constructed by a first coupling pipe 48a whose end is coupled to the first hydraulic pipe 31 and a second pipe 48b whose end is coupled to the first hydraulic transmission pipe 72. The first coupling pipe 48a is coupled to the coupling port 83a of the switching valve 81, and the second coupling pipe 48b is coupled to the exhaust port 83b. To the operation port 83c of the switching valve 81, a hydraulic operation pipe 88 branched from the first hydraulic supply pipe 42a coupled to the input port 76 of the power separating mechanism 71 is coupled.

Therefore, when the first pressure booster valve 43a is in the closed state, the control pressure does not act on the operation port 83c of the switching valve 81, and the movable element 84 of the switching valve 81 opens the communication hole 85 in a manner such that one end of the communication hole 85 is apart from the ball valve 86 by the energization force of the energization spring 87. Therefore, the first hydraulic pipe 31 and the first hydraulic transmission pipe 72 are communicated with each other by the switching valve 81. The control pressure discharged from the front pressure chamber $R_1$ in the master cylinder 11 is output from the first hydraulic pipe 31 to the wheel cylinder 28RL, passes through the coupling pipe 48, bypasses the power separating mechanism 71, and is output from the first hydraulic transmission pipe 72 to the wheel cylinder 28FR.

When the first pressure booster valve 43a is opened in this state, the control pressure adjusted by the first pressure booster valve 43a and the first pressure reducing valve 46a acts on the movable element 84 via the operation port 83c. The movable element 84 moves against the energization force of the energization spring 87, and one end of the communication hole 85 comes into contact with the ball valve 86 to close the communication hole 85. Consequently, the first hydraulic pipe 31 and the first hydraulic transmission pipe 72 are interrupted by the switching valve 81, and the control pressure discharged from the front pressure chamber $R_1$ in the master cylinder 11 is output from the first hydraulic pipe 31 only to the wheel cylinder 28RL. The control pressure adjusted by the first pressure booster valve 43a and the first pressure reducing valve 46a acts on the pressure chamber $R_{11}$ via the first hydraulic supply pipe 42a from the input port 76 of the power separating mechanism 71, and the power separation piston 74 is moved against the energization force of the energization spring 75, thereby pressurizing the pressure chamber $R_{12}$. The resultant pressure is output from the output port 77 to the wheel cylinder 28FR via the first hydraulic transmission pipe 72.

A braking force control by the brake system for a vehicle in the embodiment will now be described specifically. When an occupant steps on the brake pedal 15, the input piston 13 moves forward by the operation force, and the pressure piston 14 moves forward with the predetermined stroke $S_0$ maintained. The pedal effort sensor 63 detects the pedal effort Fp, and the ECU 61 sets the target control pressure $P_T$ on the basis of the pedal effort Fp. The ECU 61 controls the pressure booster valves 43a, 43b, 43c, and 43d and the pressure reducing valves 46a, 46b, 46c, and 46d on the basis of the target control pressure $P_T$ to control the braking hydraulic pressure of each of the wheel cylinders 28FR, 28FL, 28RR, and 28RL of the front wheels FR and FL and the rear wheels RR and RL.

In the case where the power supply system operates normally, when the first pressure booster valve 43a is opened, the control pressure adjusted by the first pressure booster valve 43a acts on the switching valve 81. Therefore, by the switching valve 81, the coupling pipe 48 is closed. The bypass pipe 55 is closed by the open/close valve 56. The ECU 61 increases or decreases the hydraulic pressure from the accumulator 40 by controlling the first pressure booster valve 43a and the first pressure reducing valve 46a on the basis of the target control pressure $P_T$, outputs the resultant hydraulic pressure to the wheel cylinder 28FR of the front wheel FR via the power separating mechanism 71, and feeds back the control pressure $P_1$ detected by the first pressure sensor 64. The ECU 61 increases or decreases the hydraulic pressure from the accumulator 40 by controlling the second pressure booster valve 43b and the second pressure reducing valve 46b on the basis of the target control pressure $P_T$, and outputs the resultant hydraulic pressure to the rear pressure chamber $R_2$ in the master cylinder 11 via the second hydraulic pressure pipe 34. In the master cylinder 11, the pressure piston 14 is assisted by applying/reducing pressure to/in the rear pressure chamber $R_2$. The front pressure chamber $R_1$ is pressurized, the resultant hydraulic pressure is output to the wheel cylinder 28FL of the front wheel FL via the first hydraulic pipe 31, and the control pressure $P_2$ detected by the second pressure sensor 65 is fed back.

Further, the ECU 61 increases or decreases the hydraulic pressure from the accumulator 40 by controlling the third and fourth pressure booster valves 43c and 43d and the third and fourth pressure reducing valves 46c and 46d on the basis of the target control pressure $P_T$, outputs the resultant hydraulic pressure to the wheel cylinders 28RR and 28RL of the rear wheels RR and RL, and feeds back the control pressures $P_3$ and $P_4$ detected by the third and fourth pressure sensors 66 and 67.

Therefore, the hydraulic pressure from the accumulator 40 is output as the braking hydraulic pressure via the pressure booster valves 43a, 43c, and 43d and the pressure reducing valves 46a, 46c, and 46d to the wheel cylinders 28FR, 28RR, and 28RL, and the hydraulic pressure from the accumulator 40 is output to the rear pressure chamber $R_2$ in the master cylinder 11 via the pressure booster valve 43b and the pressure reducing valve 46b to assist the pressure piston 14, thereby pressurizing the front pressure chamber $R_1$. The resultant hydraulic pressure is output from the front pressure chamber $R_1$ as a braking hydraulic pressure to the wheel cylinder 28FL via the first hydraulic pipe 31. Consequently, in the ABS 29, the braking hydraulic pressures of the wheel cylinders 28FR, 28FL, 28RR, and 28RL of the front wheels FR and FL and the rear wheels RR and RL are individually adjusted and applied. Thus, the braking force according to the operation force on the brake pedal 15 of the occupant can be generated for the front wheels FR and FL and the rear wheels RR and RL.

In the case where a failure occurs in the power supply system, since the first pressure booster valve 43a is in the closed state, the control pressure adjusted by the first pressure booster valve 43a does not act on the switching valve 81. By the switching valve 81, the coupling pipe 48 is opened. By the open/close valve 56, the bypass pipe 55 is opened. Consequently, when the occupant steps on the brake pedal 15, the input piston 13 moves forward by the operation force by the predetermined stroke $S_0$. The input piston 13 comes into contact with the pressure piston 14, and the pistons 13 and 14 move forward integrally. The front pressure chamber $R_1$ is pressurized, so that the hydraulic pressure in the front pressure chamber $R_1$ is discharged to the first hydraulic pipe 31. The hydraulic pressure discharged to the first hydraulic pipe 31 is applied as the braking hydraulic pressure to the wheel cylinder 28FL of the front wheel FL via the first hydraulic pipe 31, and applied as the braking hydraulic pressure to the wheel cylinder 28FR of the front wheel FR via the coupling pipe 48. Therefore, the braking force according to the operation force on the brake pedal 15 of the occupant can be generated to the front wheels FR and FL.

As described above, in the brake system for a vehicle of the fourth embodiment, the high-pressure supply pipe 41 of the accumulator 40 is coupled to the wheel cylinders 28FR, 28RR, and 28RL via the hydraulic supply pipes 42a, 42c, and 42d, respectively, and coupled to the rear pressure chamber $R_2$ via the hydraulic supply pipe 42b and the second hydraulic pipe 34. The pressure booster valves 43a, 43b, 43c, and 43d and the pressure reducing valves 46a, 46b, 46c, and 46d are attached to the hydraulic supply pipes 42a, 42b, 42c, and 42d, respectively. The wheel cylinder 28FL is coupled to the front pressure chamber $R_1$ via the first hydraulic pipe 31, the power separating mechanism 71 is coupled to the hydraulic supply pipe 42a, the wheel cylinder 28FR is coupled via the first hydraulic transmission pipe 72, and the coupling pipe 48 bypassing the power separating mechanism 71 is provided with the switching valve 81 which is opened/closed by the hydraulic pressure acting from the first pressure booster valve 43a.

Therefore, when the power supply system is normal, the switching valve 81 is closed by the hydraulic pressure acting from the first pressure booster valve 43a and the coupling pipe 48 is interrupted. Consequently, the ECU 61 sets the target control pressure $P_T$ according to the pedal effort Fp and controls the pressure booster valves 43a, 43c, and 43d and the pressure reducing valves 46a, 46c, and 46d on the basis of the target control pressure $P_T$, thereby adjusting the hydraulic pressure from the accumulator 40, and outputs the adjusted hydraulic pressure to the wheel cylinder 28FR of the front wheel FR and the wheel cylinders 28RR and 28RL of the rear wheels RR and RL. By controlling the second pressure booster valve 43b and the second pressure reducing valve 46b, the hydraulic pressure from the accumulator 40 is adjusted. The adjusted hydraulic pressure is output to the rear pressure chamber R2 via the second hydraulic pipe 34 to assist the pressure piston 14. The hydraulic pressure pressurizing the front pressure chamber $R_1$ is output to the wheel cylinder 28FL of the front wheel FL via the first hydraulic pipe 31, and a proper control pressure is made to act on each of the wheel cylinders 28FR, 28FL, 28RR, and 28RL. As a result, proper braking force according to the operation force of the brake pedal 15 of the occupant can be generated for the front wheels FR and FL and the rear wheels RR and RL.

On the other hand, when a failure occurs in the power supply system, the first pressure booster valve 43a is closed, so that the hydraulic pressure does not act on the switching valve 81 from the first pressure booster valve 43a, the switching valve 81 is open, and the coupling pipe 48 is communicated. According to an operation on the brake pedal 15, the input piston 13 and the pressure piston 14 move integrally, and the front pressure chamber $R_1$ is pressurized, and the hydraulic pressure in the front pressure chamber $R_1$ is output to the wheel cylinder 28FL of the front wheel FL via the first hydraulic pipe 31, and the hydraulic pressure in the front pressure chamber $R_1$ is output to the wheel cylinder 28FR of the front wheel FR via the first hydraulic pipe 31, the coupling pipe 48, the switching valve 81, and the first hydraulic transmission pipe 72. The braking hydraulic pressure acts on the wheel cylinders 28FR, 28FL, 28RR, and 28RL, and proper braking force according to the operation force on the brake pedal 15 of the occupant can be generated to the front wheels FR and FL and the rear wheels RR and RL.

In this case, the wheel cylinder 28FL is coupled to the first hydraulic pipe 31. On the other hand, the wheel cylinder 28FR is coupled to the hydraulic supply pipe 42a via the power separating mechanism 71 and the first hydraulic transmission pipe 72, and the coupling pipe 48 for coupling the first hydraulic pipe 31 and the hydraulic supply pipe 42a is provided with the switching valve 81 which is opened/closed by the hydraulic pressure adjusted by the first pressure booster valve 43a. Therefore, an expensive electromagnetic valve becomes unnecessary, so that simplification of the hydraulic circuit and lower cost can be realized.

Fifth Embodiment

Figure 5:
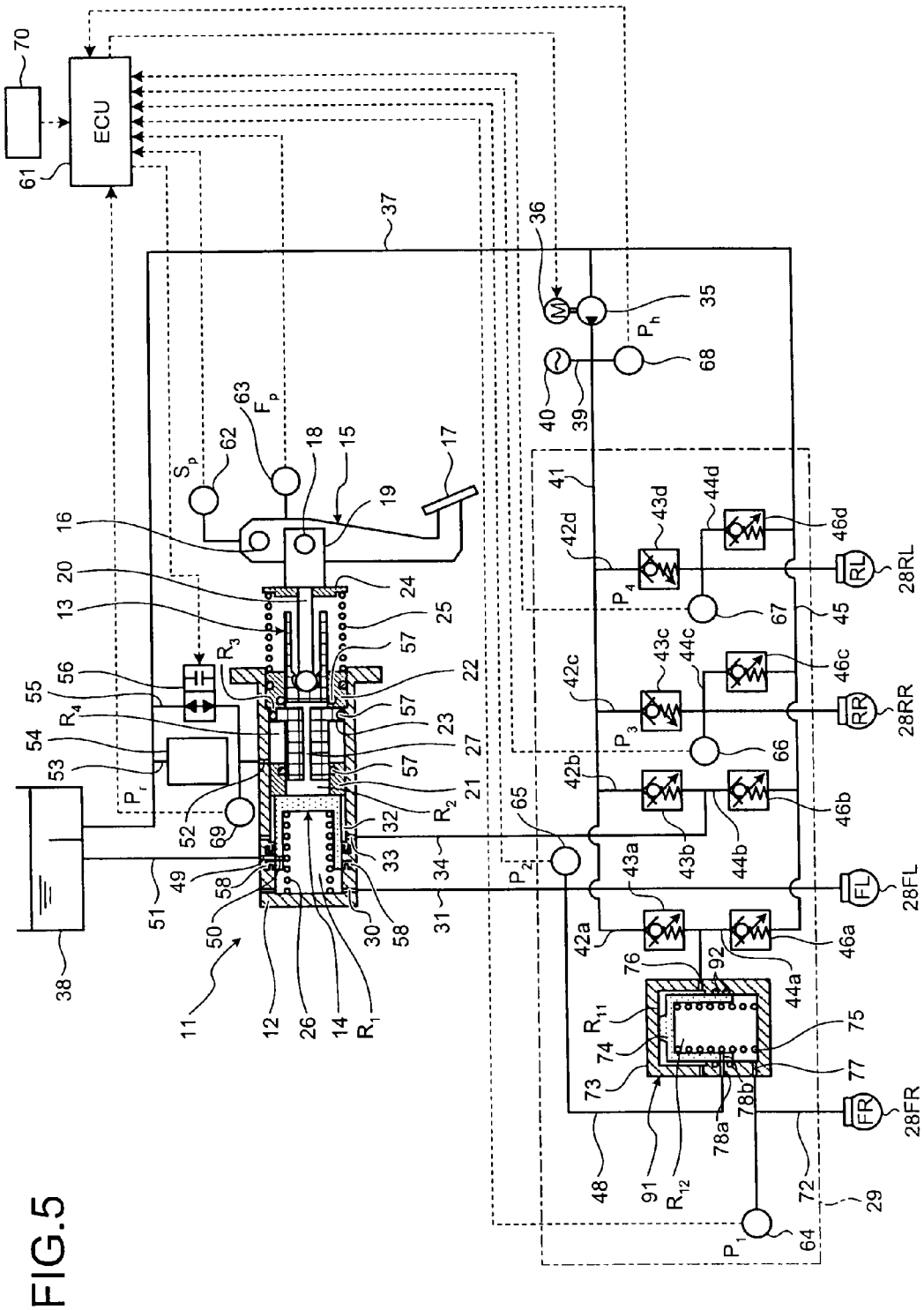
FIG. 5 is a schematic configuration diagram showing a brake system for a vehicle according to a fifth embodiment of the invention.

FIG. 5 is a schematic configuration diagram showing a brake system for a vehicle according to a fifth embodiment of the invention. FIG. 6 is a flowchart showing automatic braking force control in the brake system for a vehicle of the fifth embodiment. The same reference numerals are designated to members having functions similar to those of the foregoing embodiments and repetitive description will not be given.

In the brake system for a vehicle of the fifth embodiment, as shown in FIG. 5, the master cylinder 11 is constructed so that the input piston 13 and the pressure piston 14 are supported movably in the cylinder 12. The operation rod 20 of the brake pedal 15 is coupled to the input piston 13. By disposing the input piston 13 and the pressure piston 14 in the cylinder 12, the front pressure chamber $R_1$, the rear pressure chamber $R_2$, the circulating pressure chamber $R_3$, and the reaction force chamber $R_4$ are defined, and the rear pressure chamber $R_2$ and the circulating pressure chamber $R_3$ are communicated with each other via the communication path 27. Therefore, when the driver steps on the brake pedal 15, the input piston 13 moves forward against the energization force of the reaction force spring 25 via the operation rod 20 and comes into contact with the pressure piston 14, and the input piston 13 and the pressure piston 14 can move forward integrally.

On the other hand, the front wheels FR and FL and rear wheels RR and RL are provided with the wheel cylinders 28FR, 28FL, 28RR, and 28RL, and can be operated by the ABS 29. In the ABS 29, to the first pressure port 30 communicated with the front pressure chamber $R_1$ of the master cylinder 11, one end of the first hydraulic pipe 31 is coupled. The other end of the first hydraulic pipe 31 is coupled to the wheel cylinder 28FL of the front wheel FL. One end of the second hydraulic pipe 34 is coupled to the second pressure port 33 communicated with the rear pressure chamber $R_2$ of the master cylinder 11 via the annular coupling path 32.

The four hydraulic supply pipes 42*a*, 42*b*, 42*c*, and 42*d* are coupled to the accumulator 40 capable of accumulating the hydraulic pressure boosted by the hydraulic pump 35 via the high-pressure supply pipe 41. The distal end of the first hydraulic supply pipe 42*a* is coupled to a power separation switching valve 91 having the functions of the switching valve and the power separating mechanism of the present invention. The power separation switching valve 91 is coupled to the wheel cylinder 28FR of the front wheel FR via the first hydraulic transmission pipe 72. The distal end of the third hydraulic supply pipe 42*c* is coupled to the wheel cylinder 28RR of the rear wheel RR, and the fourth hydraulic supply pipe 42*d* is coupled to the wheel cylinder 28RL of the rear wheel RL. The electromagnetic pressure booster valves 43*a*, 43*b*, 43*c*, and 43*d* of the normal open type are disposed in the hydraulic supply pipes 42*a*, 42*b*, 42*c*, and 42*d*, respectively.

The hydraulic exhaust pipes 44*a*, 44*b*, 44*c*, and 44*d* are coupled on the downstream side of the pressure booster valves 43*a*, 43*b*, 43*c*, and 43*d* in the hydraulic supply pipes 42*a*, 42*b*, 42*c*, and 42*d*, and the hydraulic exhaust pipes 44*a*, 44*b*, 44*c*, and 44*d* are collected and coupled to the pipe 37 via the third hydraulic pipe 45. The electromagnetic pressure reducing valves 46*a*, 46*b*, 46*c*, and 46*d* of a normal close type are disposed in the hydraulic exhaust pipes 44*a*, 44*b*, 44*c*, and 44*d*, respectively. The other end of the second hydraulic pipe 34 is coupled to a coupling part between the hydraulic supply pipe 42*b* and the hydraulic exhaust pipe 44*b*, that is, the pipe between the second pressure booster valve 43*b* and the second pressure reducing valve 46*b*.

In the power separation switching valve 91, the power separation piston 74 is movably supported in the cylinder 73 and is energized to one side and supported by the energization spring 75, thereby defining two pressure chambers $R_{11}$ and $R_{12}$. The first hydraulic supply pipe 42*a* is coupled to the input port 76 communicated with the pressure chamber $R_{11}$ and, on the other hand, the first hydraulic transmission pipe 72 is coupled to the output port 77 communicated with the pressure chamber $R_{12}$. In the cylinder 73 and the power separation piston 74, auxiliary ports 78*a* and 78*b* penetrating them are formed. Seals 92 are attached on both sides of the auxiliary port 78*a* to prevent leakage of hydraulic pressure. One end of the coupling pipe 48 is coupled to the first hydraulic pipe 31 and the other end is coupled to the auxiliary port 78*a* of the power separation switching valve 91. The first hydraulic transmission pipe 72 is provided with the first pressure sensor 64 for detecting hydraulic pressure.

Therefore, when the first pressure booster valve 43*a* is in the closed state, the hydraulic pressure does not act on the input port 76 of the power separation switching valve 91, and the power separation piston 74 is energized to one side by the energization force of the energization spring 75, so that the coupling pipe 48 and the pressure chamber $R_{12}$ are communicated with each other via the auxiliary ports 78*a* and 78*b*. Consequently, the control pressure discharged from the front pressure chamber $R_1$ in the master cylinder 11 is output from the first hydraulic pipe 31 to the pressure chamber $R_{12}$ of the power separation switching valve 91 via the coupling pipe 48, and is output via the first hydraulic transmission pipe 72 to the wheel cylinder 28FR.

When the first pressure booster valve 43*a* is opened in this state, and the control pressure adjusted by the first pressure booster valve 43*a* acts on the input port 76 of the power separation switching valve 91, the power separation piston 74 moves to the other side against the energization force of the energization spring 75, so that the auxiliary port 78*b* is deviated from the auxiliary port 78*a*, so that communication between the coupling pipe 48 and the pressure chamber $R_{12}$ is interrupted. Consequently, the control pressure discharged from the front pressure chamber R1 in the master cylinder 11 is output from the first hydraulic pipe 31 only to the wheel cylinder 28RL. The control pressure adjusted by the first pressure booster valve 43*a* and the first pressure reducing valve 46*a* acts on the pressure chamber $R_{11}$ via the first hydraulic supply pipe 42*a* from the input port 76 of the power separation switching valve 91, and the power separation piston 74 is moved against the energization force of the energization spring 75, thereby pressurizing the pressure chamber $R_{12}$. The resultant pressure is output from the output port 77 to the wheel cylinder 28FR via the first hydraulic transmission pipe 72.

A braking force control by the brake system for a vehicle in the embodiment will now be described specifically. When an occupant steps on the brake pedal 15, the input piston 13 moves forward by the operation force, and the pressure piston 14 moves forward with the predetermined stroke $S_0$ maintained. The pedal effort sensor 63 detects the pedal effort Fp, and the ECU 61 sets the target control pressure $P_T$ on the basis of the pedal effort Fp. The ECU 61 controls the pressure booster valves 43*a*, 43*b*, 43*c*, and 43*d* and the pressure reducing valves 46*a*, 46*b*, 46*c*, and 46*d* on the basis of the target control pressure $P_T$ to control the braking hydraulic pressure of each of the wheel cylinders 28FR, 28FL, 28RR, and 28RL of the front wheels FR and FL and the rear wheels RR and RL.

In the case where the power supply system operates normally, when the first pressure booster valve 43*a* is opened, the control pressure adjusted by the first pressure booster valve 43*a* acts on the power separation switching valve 91. Therefore, by the power separation switching valve 91, the coupling pipe 48 is closed. The bypass pipe 55 is closed by the open/close valve 56. The ECU 61 increases or decreases the hydraulic pressure from the accumulator 40 by controlling the first pressure booster valve 43*a* and the first pressure reducing valve 46*a* on the basis of the target control pressure $P_T$, outputs the resultant hydraulic pressure to the wheel cylinder 28FR of the front wheel FR via the power separation switching valve 91, and feeds back the control pressure $P_1$ detected by the first pressure sensor 64. The ECU 61 increases or decreases the hydraulic pressure from the accumulator 40 by controlling the second pressure booster valve 43*b* and the second pressure reducing valve 46*b* on the basis of the target control pressure $P_T$, and outputs the resultant hydraulic pressure to the rear pressure chamber $R_2$ in the master cylinder 11 via the second hydraulic pressure pipe 34. In the master cylinder 11, the pressure piston 14 is assisted by applying/reducing pressure to/in the rear pressure chamber $R_2$. The front pressure chamber $R_1$ is pressurized, the resultant hydraulic pressure is output to the wheel cylinder 28FL of the front wheel FL via the first hydraulic pipe 31, and the control pressure $P_2$ detected by the second pressure sensor 65 is fed back.

Further, the ECU 61 increases or decreases the hydraulic pressure from the accumulator 40 by controlling the third and fourth pressure booster valves 43c and 43d and the third and fourth pressure reducing valves 46c and 46d on the basis of the target control pressure $P_T$, outputs the resultant hydraulic pressure to the wheel cylinders 28RR and 28RL of the rear wheels RR and RL, and feeds back the control pressures $P_3$ and $P_4$ detected by the third and fourth pressure sensors 66 and 67.

Therefore, the hydraulic pressure from the accumulator 40 is output as the braking hydraulic pressure via the pressure booster valves 43a, 43c, and 43d and the pressure reducing valves 46a, 46c, and 46d to the wheel cylinders 28FR, 28RR, and 28RL, and the hydraulic pressure from the accumulator 40 is output to the rear pressure chamber $R_2$ in the master cylinder 11 via the pressure booster valve 43b and the pressure reducing valve 46b to assist the pressure piston 14, thereby pressuring the front pressure chamber $R_1$. The hydraulic pressure from the front pressure chamber $R_1$ is output as a braking hydraulic pressure to the wheel cylinder 28FL via the first hydraulic pipe 31. Consequently, in the ABS 29, the braking hydraulic pressures of the wheel cylinders 28FR, 28FL, 28RR, and 28RL of the front wheels FR and FL and the rear wheels RR and RL are individually adjusted and applied. Thus, the braking force according to the operation force on the brake pedal 15 of the occupant can be generated for the front wheels FR and FL and the rear wheels RR and RL.

By controlling the pressure booster valves 43a, 43b, 43c, and 43d and the pressure reducing valves 46a, 46b, 46c, and 46d regardless of the stepping operation on the brake pedal 15 of the occupant, the braking force is acted automatically. In the automatic braking force control in the brake system for a vehicle, as shown in FIG. 6, the ECU 61 determines whether a present mode is an automatic brake mode or not in step S31. When it is determined that the present mode is not the automatic brake mode, the ECU 61 goes out from the routine without performing anything. On the other hand, when it is determined that the present mode is the automatic brake mode, in step S32, the ECU 61 sets target control pressures $P_{T1}$ and $P_{T2}$ in accordance with the present travel state of the vehicle.

In step S33, the ECU 61 controls the pressure booster valves 43a, 43b, 43c, and 43d on the basis of a target pre-control pressure $P_{TP}$ which is preset, thereby boosting the hydraulic pressure from the accumulator 40, and supplies the hydraulic pressure to the pressure chamber $R_{11}$ via the input port 76 of the power separation switching valve 91. In this case, the target pre-control pressure $P_{TP}$ is a hydraulic pressure based on which the hydraulic pressure is supplied to the pressure chamber $R_{11}$ of the power separation switching valve 91 so that the power separation piston 74 moves against the energization force of the energization spring 75, and the auxiliary port 78b is deviated from the auxiliary port 78a, thereby enabling the communication between the coupling pipe 48 and the pressure chamber $R_{12}$ to be interrupted.

The hydraulic pressure from the accumulator 40 is adjusted by the first pressure booster valve 43a, and the hydraulic pressure supplied to the pressure chamber $R_{11}$ of the power separation switching valve 91 increases. In step S34, whether the control pressure $P_1$ detected by the first pressure sensor 64 exceeds the target pre-control pressure $P_{TP}$ or not is determined. When it is determined that the control pressure $P_1$ does not exceed the target pre-control pressure $P_{TP}$, the ECU 61 returns to step S33 and pressure boosting is continued. On the other hand, when it is determined that the control pressure $P_1$ exceeds the target pre-control pressure $P_{TP}$, the ECU 61 completes pre-pressure boosting of the power separation switching valve 91 in step S35. In step S36, the ECU 61 increases or decreases the hydraulic pressure from the accumulator 40 by controlling the pressure booster valves 43a, 43b, 43c, and 43d and the pressure reducing valves 46a, 46b, 46c, and 46d on the basis of the target control pressures $P_{T1}$ and $P_{T2}$, and outputs the resultant hydraulic pressure to the wheel cylinders 28FR and 28FL.

In this case, the ECU 61 increases or decreases the hydraulic pressure from the accumulator 40 by controlling the first pressure booster valve 43a and the first pressure reducing valve 46a, and can output the resultant hydraulic pressure to the wheel cylinder 28FR of the front wheel FR via the power separation switching valve 91. The ECU 61 can also increase or decrease the hydraulic pressure from the accumulator 40 by controlling the second pressure booster valve 43b and the second pressure reducing valve 46b, output the resultant hydraulic pressure to the rear pressure chamber $R_2$ in the master cylinder 11 via the second hydraulic pipe 34, assist the pressure piston 14, discharge the hydraulic pressure to the first hydraulic pipe 31, and output the hydraulic pressure to the wheel cylinder 28FL of the front wheel FL. That is, also in the automatic braking force control in the brake system for a vehicle, the wheel cylinders 28FR and 28FL of the right and left wheels FR and FL can be independently controlled.

In the case where a failure occurs in the power supply system, since the first pressure booster valve 43a is in the closed state, the control pressure adjusted by the first pressure booster valve 43a does not act on the power separation switching valve 91. By the power separating switching valve 91, the coupling pipe 48 is opened. By the open/close valve 56, the bypass pipe 55 is opened. Consequently, when the occupant steps on the brake pedal 15, the input piston 13 moves forward by the operation force by the predetermined stroke $S_0$. The input piston 13 comes into contact with the pressure piston 14, and the pistons 13 and 14 move forward integrally. The front pressure chamber $R_1$ is pressurized, so that the hydraulic pressure in the front pressure chamber $R_1$ is discharged to the first hydraulic pipe 31. The hydraulic pressure discharged to the first hydraulic pipe 31 is applied as the braking hydraulic pressure to the wheel cylinder 28FL of the front wheel FL via the first hydraulic pipe 31, applied to the power separation switching valve 91 via the coupling pipe 48, and applied as the baking hydraulic pressure to the wheel cylinder 28FR of the front wheel FR via the power separation switching valve 91. Therefore, the braking force according to the operation force on the brake pedal 15 of the occupant can be generated to the front wheels FR and FL.

As described above, in the brake system for a vehicle of the fifth embodiment, the high-pressure supply pipe 41 of the accumulator 40 is coupled to the wheel cylinders 28FR, 28RR, and 28RL via the hydraulic supply pipes 42a, 42c, and 42d, respectively, and coupled to the rear pressure chamber $R_2$ via the hydraulic supply pipe 42b and the second hydraulic pipe 34. The pressure booster valves 43a, 43b, 43c, and 43d and the pressure reducing valves 46a, 46b, 46c, and 46d are attached to the hydraulic supply pipes 42a, 42b, 42c, and 42d, respectively. The wheel cylinder 28FL is coupled to the front pressure chamber $R_1$ via the first hydraulic pipe 31, the power separation switching valve 91 is coupled to the hydraulic supply pipe 42a, the wheel cylinder 28FR is coupled via the first hydraulic transmission pipe 72, and the coupling pipe 48 coupled to the first hydraulic pipe 31 is coupled to the first hydraulic transmission pipe 72 via the power separation switching valve 91.

Therefore, when the power supply system is normal, the coupling pipe 48 is interrupted by the power separation switching valve 91 using the hydraulic pressure acting from the first pressure booster valve 43a. Consequently, the ECU 61 sets the target control pressure $P_T$ according to the pedal effort Fp and controls the pressure booster valves 43a, 43c, and 43d and the pressure reducing valves 46a, 46c, and 46d on the basis of the target control pressure $P_T$, thereby adjusting the hydraulic pressure from the accumulator 40, and outputs the adjusted hydraulic pressure to the wheel cylinder 28FR of the front wheel FR and the wheel cylinders 28RR and 28RL of the rear wheels RR and RL. By controlling the second pressure booster valve 43b and the second pressure reducing valve 46b, the hydraulic pressure from the accumulator 40 is adjusted. The adjusted hydraulic pressure is output to the rear pressure chamber $R_2$ via the second hydraulic pipe 34 to assist the pressure piston 14. The hydraulic pressure pressurizing the front pressure chamber $R_1$ is output to the wheel cylinder 28FL of the front wheel FL via the first hydraulic pipe 31, and a proper control pressure is made to act on each of the wheel cylinders 28FR, 28FL, 28RR, and 28RL. As a result, proper braking force according to the operation force of the brake pedal 15 of the occupant can be generated for the front wheels FR and FL and the rear wheels RR and RL.

At this time, the ECU 61 adjusts the hydraulic pressure from the accumulator 40 by the first pressure booster valve 43a, and supplies the adjusted pressure to the pressure chamber $R_{11}$ of the power separation switching valve 91 to perform pre-pressurization. The power separation piston 74 of the power separation switching valve 91 moves, the auxiliary port 78b is deviated from the auxiliary port 78a, and communication between the coupling pipe 48 and the pressure chamber $R_{12}$ is interrupted. After that, the ECU 61 adjusts the hydraulic pressure from the accumulator 40 by controlling the pressure booster valves 43a, 43b, 43c, and 43d and the pressure reducing valves 46a, 46b, 46c, and 46d, and outputs the adjusted hydraulic pressure to the wheel cylinders 28FR, 28FL, 28RR, and 28RL. Thus, also by the automatic braking force control in the brake system for a vehicle, the wheel cylinders 28FR and 28FL of the right and left front wheels FR and FL can be independently controlled with high precision.

On the other hand, when a failure occurs in the power supply system, the first pressure booster valve 43a is closed, so that the hydraulic pressure does not act on the power separation switching valve 91 from the first pressure booster valve 43a, and the coupling pipe 48 is communicated by the power separation switching valve 91. According to an operation on the brake pedal 15, the input piston 13 and the pressure piston 14 move integrally, and the front pressure chamber $R_1$ is pressurized, the hydraulic pressure in the front pressure chamber $R_1$ is output to the wheel cylinder 28FL of the front wheel FL via the first hydraulic pipe 31, and the hydraulic pressure in the front pressure chamber $R_1$ is also output to the wheel cylinder 28FR of the front wheel FR via the first hydraulic pipe 31, the coupling pipe 48, the power separation switching valve 91, and the first hydraulic transmission pipe 72. The braking hydraulic pressure acts on the wheel cylinders 28FR, 28FL, 28RR, and 28RL, and proper braking force according to the operation force on the brake pedal 15 of the occupant can be generated to the front wheels FR and FL and the rear wheels RR and RL.

The brake system for a vehicle of the fifth embodiment is provided with the power separation switching valve 91 having the functions of the switching valve capable of making the wheel cylinders 28FR and 28FL communicated with each other or interrupted from each other and the power separating mechanism of separating the hydraulic system on the accumulator 40 side and the hydraulic system on the wheel cylinder 28FR side. Therefore, simplification of the hydraulic circuit and lower cost can be realized.

In the foregoing embodiments, the master cylinder 11 is constructed by movably supporting the input piston 13 and the pressure piston 14 as drive pistons in the cylinder 12. Alternately, a single drive piston may be movably supported in the cylinder. In this case, a front pressure chamber and a rear pressure chamber are defined in the travel direction of the drive piston in the cylinder.

INDUSTRIAL APPLICABILITY

As described above, the brake system for a vehicle of the present invention is directed to assure a proper braking force by enabling hydraulic pressure to be supplied to a wheel cylinder even when a power supply unit fails and can be suitably used as a brake system of any kind.

The invention claimed is:

1. A brake system for a vehicle, comprising:
an operation member on which a braking operation is performed by an occupant;
a master cylinder in which a front pressure chamber and a rear pressure chamber are defined by a drive piston, which is movable and supported in the master cylinder and which outputs a hydraulic pressure in the front pressure chamber by the drive piston being moved by the operation member;
a control pressure setting unit configured to set a target control pressure according to an operation force input from the operation member to the drive piston;
a hydraulic pressure supply source;
first and second wheel cylinders coupled to the front pressure chamber that generate a braking force to wheels;
a first pressure control valve that adjusts a hydraulic pressure from the hydraulic pressure supply source on the basis of the target control pressure, and that outputs a first adjusted hydraulic pressure to the first wheel cylinder;
a second pressure control valve that adjusts the hydraulic pressure from the hydraulic pressure supply source on the basis of the target control pressure, and that outputs a second adjusted hydraulic pressure directly to the rear pressure chamber to assist the drive piston to output the hydraulic pressure in the front pressure chamber directly to one of the first and second wheel cylinders; and
a switching valve that makes a hydraulic connection between the first and second wheel cylinders or that interrupts the hydraulic connection.

2. The brake system for a vehicle according to claim 1, wherein the first and second wheel cylinders are wheel cylinders that generate a braking force to right and left front wheels.

3. The brake system for a vehicle according to claim 1, wherein the hydraulic pressure supply source includes an accumulator.

4. The brake system for a vehicle according to claim 1, further comprising
third and fourth wheel cylinders coupled to the hydraulic pressure supply source that generate a braking force to right and left rear wheels, and
third and fourth pressure control valves that adjust the hydraulic pressure from the hydraulic pressure supply source on the basis of the target control pressure and that output respective third and fourth adjusted hydraulic pressures to the third and fourth wheel cylinders.

5. The brake system for a vehicle according to claim 1, wherein the drive piston includes an input piston and a pressure piston disposed in series in the master cylinder,
   an operation force of the operation member is inputted to the input piston,
   the front pressure chamber is defined in front of the pressure piston, and
   the rear pressure chamber is defined between the input piston and the pressure piston.

6. The brake system for a vehicle according to claim 1, wherein a hydraulic line that adjusts the hydraulic pressure from the hydraulic pressure supply source and that outputs the first adjusted hydraulic pressure to the first wheel cylinder is provided with a power separating mechanism in series with the first pressure control valve.

7. The brake system for a vehicle according to claim 6, further comprising
   a coupling line that couples the first and second wheel cylinders while bypassing the power separating mechanism,
   wherein the coupling line is provided with the switching valve.

8. The brake system for a vehicle according to claim 1, wherein the switching valve makes the hydraulic connection between the first and second wheel cylinders or interrupts the hydraulic connection based on the first hydraulic pressure adjusted by the first pressure control valve.

9. The brake system for a vehicle according to claim 6, wherein the switching valve makes the hydraulic connection between the first and second wheel cylinders or interrupts the hydraulic connection based on a hydraulic pressure acting on the power separating mechanism.

10. The brake system for a vehicle according to claim 9, wherein the hydraulic connection between the first and second wheel cylinders is interrupted by the first pressure control valve making a pre-control hydraulic pressure act on the power separating mechanism, and after that, the hydraulic pressure from the hydraulic pressure supply source is adjusted by the first and second pressure control valves on the basis of the target control pressure.

11. The brake system for a vehicle according to claim 1, wherein when current flows to the switching valve, the switching valve interrupts the hydraulic connection between the first and second wheel cylinders, and when a control pressure of any of the first and second wheel cylinders is lower than the target control pressure by a preset specific value or more, the switching valve makes the hydraulic connection between the first and second wheel cylinders.

12. The brake system for a vehicle according to claim 11, wherein when control pressures of both of the first and second wheel cylinders are lower than the target control pressure by the preset specific value or more, the switching valve interrupts the hydraulic connection between the first and second wheel cylinders.

13. The brake system for a vehicle according to claim 1, wherein when current does not flow to the switching valve, the switching valve makes the hydraulic connection between the first and second wheel cylinders.

14. The brake system for a vehicle according to claim 1, wherein the drive piston outputs the hydraulic pressure in the front pressure chamber to the second wheel cylinder when current flows to the switching valve, and outputs the hydraulic pressure in the front pressure chamber to the first and second wheel cylinders when current does not flow to the switching valve.

15. The brake system for a vehicle according to claim 4, wherein the drive piston outputs the hydraulic pressure in the front pressure chamber to the second wheel cylinder when current flows to the switching valve, and outputs the hydraulic pressure in the front pressure chamber to the first, second, third, and fourth wheel cylinders when current does not flow to the switching valve.

16. A brake system for a vehicle, comprising:
   an operation member on which a braking operation is performed by an occupant;
   a master cylinder in which a front pressure chamber and a rear pressure chamber are defined by a drive piston, which is movable and supported in the master cylinder and which outputs a hydraulic pressure in the front pressure chamber by the drive piston being moved by the operation member;
   a control pressure setting unit configured to set a target control pressure according to an operation force input from the operation member to the drive piston;
   a hydraulic pressure supply source;
   first and second wheel cylinders coupled to the front pressure chamber and third and fourth wheel cylinders coupled to the hydraulic pressure supply source, which generate a braking force to wheels;
   a first pressure control valve that adjusts a hydraulic pressure from the hydraulic pressure supply source on the basis of the target control pressure, and that outputs a first adjusted hydraulic pressure to the first wheel cylinder;
   a second pressure control valve that adjusts the hydraulic pressure from the hydraulic pressure supply source on the basis of the target control pressure, and that outputs a second adjusted hydraulic pressure directly to the rear pressure chamber to assist the drive piston to output the hydraulic pressure in the front pressure chamber directly to one of the first and second wheel cylinders; and
   one switching valve that makes a hydraulic connection between the first, second, third, and fourth wheel cylinders or that interrupts the hydraulic connection.

* * * * *